United States Patent [19]

Kondo et al.

[11] Patent Number: 5,564,352
[45] Date of Patent: Oct. 15, 1996

[54] SEEDLING PLANTING APPARATUS HAVING AN OPERATION PLATFORM

[75] Inventors: Tadashi Kondo, Minoo; Toshiro Wada, Tsuzuki-gun; Tokuo Tamura, Suita; Arimasa Ichimiya, Matsumoto; Yuji Ohara, Okayama, all of Japan

[73] Assignee: Yanmar Agricultural Equipment Co., Ltd., Osaka, Japan

[21] Appl. No.: 365,816

[22] Filed: Dec. 29, 1994

[30] Foreign Application Priority Data

Dec. 30, 1993 [JP] Japan ................... 5-351512

[51] Int. Cl.⁶ .......................................... A01C 11/02
[52] U.S. Cl. ................. 111/104; 111/105; 414/501
[58] Field of Search ................ 47/101, 901; 111/100, 111/101, 103, 104, 105, 115, 117, 919; 172/26, 282, 284; 414/500, 501, 502

[56] References Cited

U.S. PATENT DOCUMENTS

| | | | |
|---|---|---|---|
| 3,446,164 | 5/1969 | Huang et al. ................ | 111/105 X |
| 3,625,294 | 12/1971 | Morkoski ................... | 172/282 |
| 4,289,080 | 9/1981 | Penley ....................... | 111/105 |
| 4,788,920 | 12/1988 | Shaw ......................... | 111/2 |
| 4,893,571 | 1/1990 | Häkli et al. ................ | 111/105 |
| 5,121,799 | 6/1992 | Barnes et al. .............. | 172/26 X |
| 5,209,170 | 5/1993 | Kobayashi ................. | 111/105 |
| 5,445,089 | 8/1995 | Houng et al. .............. | 111/105 |

FOREIGN PATENT DOCUMENTS

WO94/03040  2/1994  WIPO.

*Primary Examiner*—Terry Lee Melius
*Assistant Examiner*—Robert Pezzuto
*Attorney, Agent, or Firm*—Brinks Hofer Gilson & Lione

[57] ABSTRACT

A seedling planting apparatus wherein a body of the seedling planting apparatus including one planting unit or a plurality of planting units for picking a seedling from each pot provided in a seedling tray to plant them in the field is connected to the rear portion of a traveling vehicle, wherein the body of the seedling planting apparatus is provided at its front portion with an operation platform and the planting unit is arranged such that an empty seedling tray wherein the planting operation has been finished, is withdrawn at the front portion of the body of the seedling planting apparatus. The thus constituted seedling planting apparatus can travel stably and straightly, and in the apparatus, an excessive force is not applied on the connection between the body and the traveling vehicle, and during the turning, little jolt is caused, and at the same time, an operator standing on the platform can effect all operations without getting down from the platform.

19 Claims, 21 Drawing Sheets

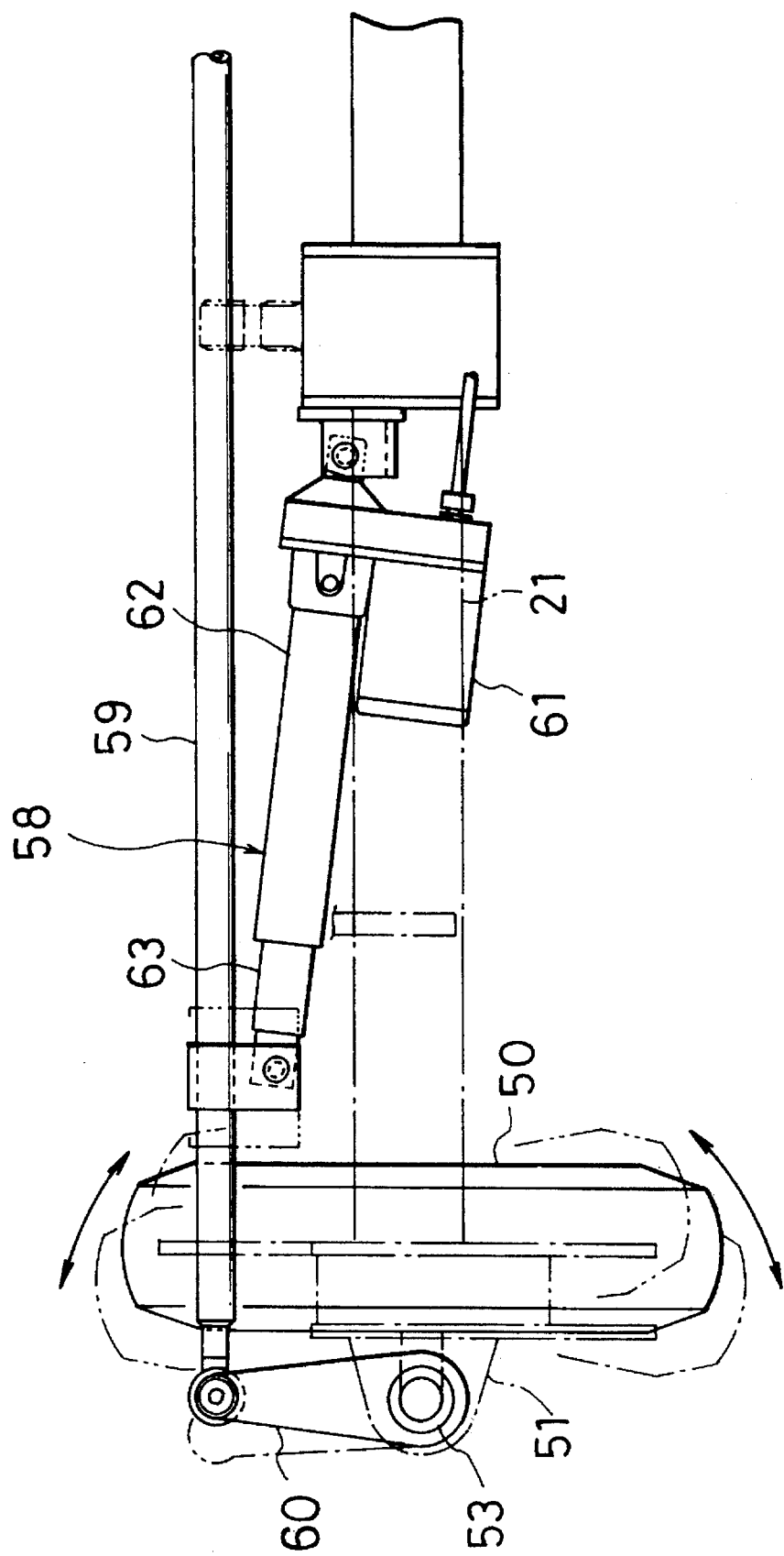

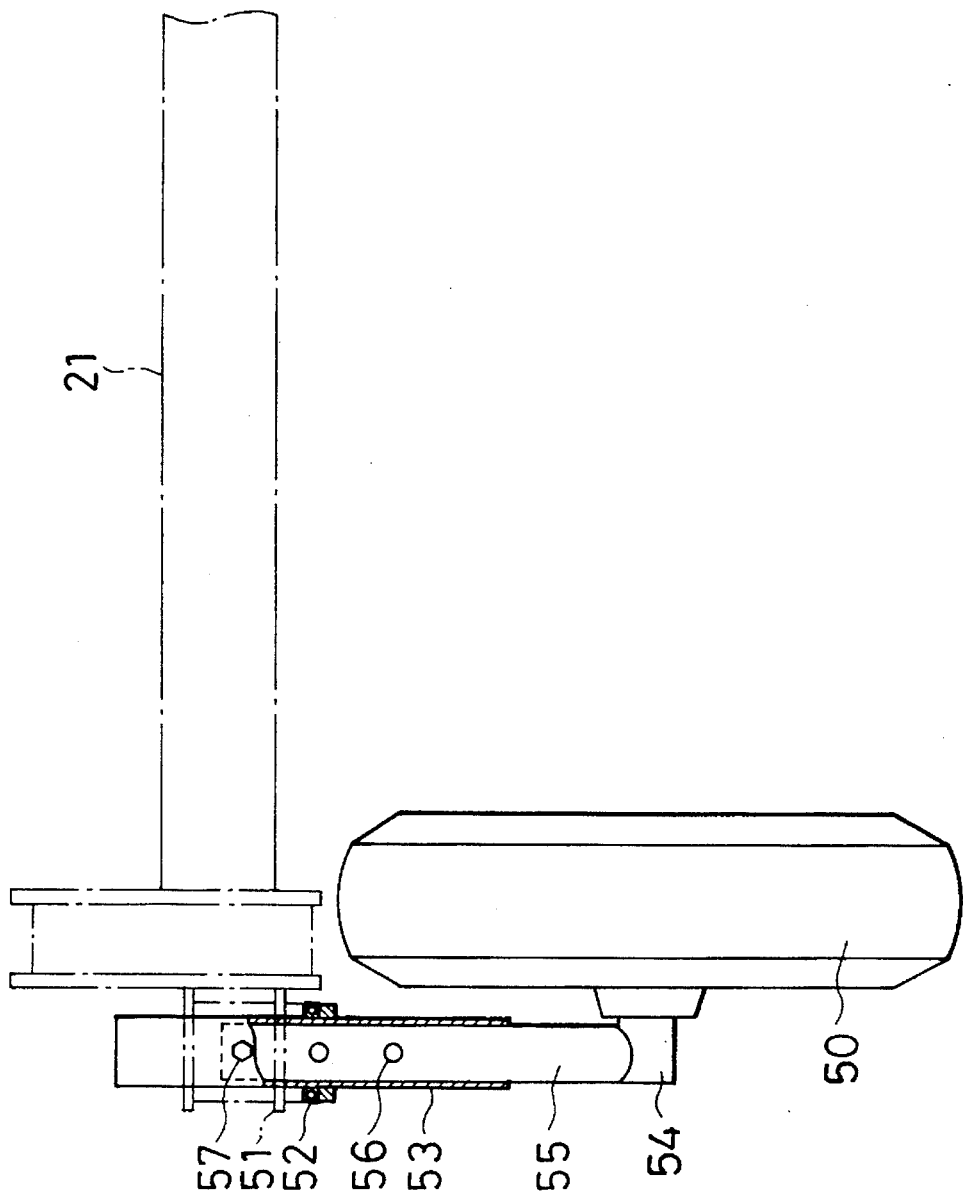

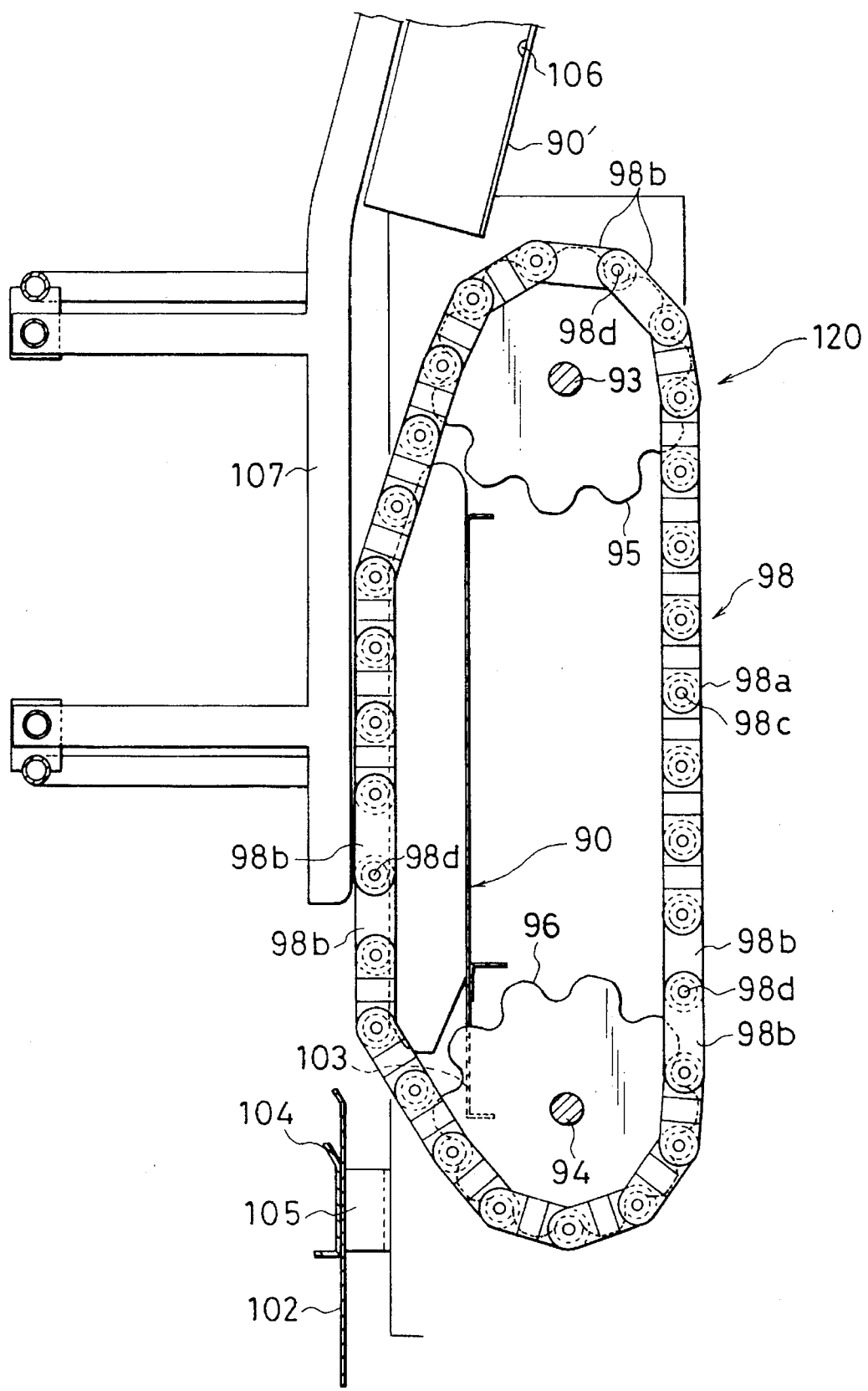

SEEDLING PLANTING APPARATUS HAVING AN OPERATION PLATFORM

BACKGROUND OF THE INVENTION

The present invention relates to a seedling planting apparatus having an operation platform.

DESCRIPTION OF THE PRIOR ART

A seedling planting apparatus wherein a body is connected to the rear side of the tractor and a seedling planting unit is installed in the body, arranged such that a seedling is picked from a seedling tray placed on a table in the seedling planting unit and planted by a seedling planting claws, is known. In such a seedling planting apparatus, generally, an operator stands on a platform located at the rear of the body and effects various operations such as a clutch operation, etc. and workings wherein before a seedling tray becomes empty, a second seedling tray is supplied newly and the empty seedling tray is withdrawn.

However, if the platform is located at the rear of the body, the operating system of the body has to be located at the rear of the body necessarily, and thus, a load is applied on the rear portion of the body. Therefore, during the operation, the stability of the seedling planting apparatus becomes worse and an excessive load is exerted on the connection between the body and the traveling vehicle such as the tractor, etc. thereby damaging the connection. Further, during the turning of the seedling planting apparatus, the apparatus tends to be jolted, and thus, there is a possibility that the operator exposes himself to danger. Furthermore, when such a seedling planting apparatus travels on an inclined ground, there is a problem that the body tends to be directed downward of the inclined ground due to the rolling of the body.

On the other hand, U.S. Pat. No. 4,893,571 discloses a seedling planting apparatus including a traveling vehicle and a body connected to the traveling vehicle and provided at the front portion of the body with an operation platform.

However, in this apparatus, it is very difficult that an operator standing on the platform withdraw the empty seedling tray. Further, preliminary seedlings is located at the side of the traveling vehicle, and thus, it is inconvenient to supply the seedlings to the body effectively.

SUMMARY OF THE INVENTION

It is therefore an object of the present invention to provide a seedling planting apparatus which can travel stably and straightly, and wherein an excessive force is not applied on the connection between the body and the traveling vehicle, and during the turning, little jolt is caused, and at the same time, an operator standing on the platform can effect all operations without getting down from the platform.

The above and other objects of the present invention can be accomplished by a seedling planting apparatus wherein a body of the seedling planting apparatus including one planting unit or a plurality of planting units for picking a seedling from each pot provided in a seedling tray to plant them in the field is connected to the rear portion of a traveling vehicle, wherein the body of the seedling planting apparatus is provided at its front portion with an operation platform and the planting unit is arranged such that an empty seedling tray wherein the planting operation has been finished, is withdrawn at the front portion of the body of the seedling planting apparatus.

Further, the above and other objects of the present invention can be accomplished by a seedling planting apparatus wherein a body of the seedling planting apparatus including one planting unit or a plurality of planting units for picking a seedling from each pot provided in a seedling tray to plant them in the field is connected to the rear portion of a traveling vehicle, wherein the rear portion of the planting unit is resiliently supported on the body of the seedling planting apparatus.

Furthermore, the above and other objects of the present invention can be accomplished by a seedling planting apparatus wherein a body of the seedling planting apparatus including one planting unit or a plurality of planting units for picking a seedling from each pot provided in a seedling tray to plant them in the field is connected to the rear portion of a traveling vehicle, wherein the body of the seedling planting apparatus is provided at its front portion with a pair of steerable gauge wheels for adjusting the planting depth of the seedling.

Furthermore, the above and other objects of the present invention can be accomplished by a seedling planting unit for picking a seedling from each pot provided in a seedling tray to plant them in the field wherein the seedling planting unit is installed in a body of a seedling planting apparatus connected to the rear portion of a traveling vehicle, and includes an unit frame mounted on the body of the seedling planting apparatus to be vertically moved, a table for placing the seedling tray, a travers feeding mechanism for moving the table back and forth, a longitudinal feeding mechanism for moving the table downwardly pot by pot, seedling picker means for picking the seedling from the pot, and seedling planting means for receiving the seedling from the seedling picker means to plant it in the field and the planting unit is arranged such that an empty seedling tray wherein the planting operation has been finished, is withdrawn at the front portion of the body of the seedling planting apparatus.

In a preferred aspect of the present invention, the planting unit includes an unit frame mounted on the body of the seedling planting apparatus to be vertically moved, a table for placing the seedling tray, a travers feeding mechanism for moving the table back and forth, a longitudinal feeding mechanism for moving the table downwardly pot by pot, seedling picker means for picking the seedling from the pot, and seedling planting means for receiving the seedling from the seedling picker means to plant it in the field.

In another preferred aspect of the present invention, the table is arranged so as to be slided along the unit frame.

In a further preferred aspect of the present invention, the seedling picker means and the seedling planting means are located at a central portion in the longitudinal direction of the planting unit, and a transmission device for the seedling picker means and the seedling planting means is located at one side of these means.

In a further preferred aspect of the present invention, a table for placing a preliminary seedling tray is provided adjacent to the table for placing the seedling tray.

In a further preferred aspect of the present invention, the width of the frame defining the body of the seedling planting apparatus is adapted to be adjustable.

In a further preferred aspect of the present invention, below the planting unit, wheels for leveling a field is provided in front of the seedling planting means and wheels for covering the planted portion with soil is provided at rear of the seedling planting means.

In a further preferred aspect of the present invention, power is transmitted to the planting unit through a PTO shaft of the traveling vehicle.

In a further preferred aspect of the present invention, the rear portion of the planting unit is resiliently supported on the body of the seedling planting apparatus.

In a further preferred aspect of the present invention, the body of the seedling planting apparatus is provided at its front portion with a pair of steerable gauge wheels for adjusting the planting depth of the seedling.

BRIEF DESCRIPTION OF THE DRAWINGS

FIG. 6A is a view showing the steering mechanism of the gauge wheels and FIG. 6B is a view showing the details of the mounting of the gauge wheels.

FIG. 12 is a view showing the endless chain in the longitudinal feeding mechanism.

DESCRIPTION OF THE PREFERRED EMBODIMENT

Figure 1:
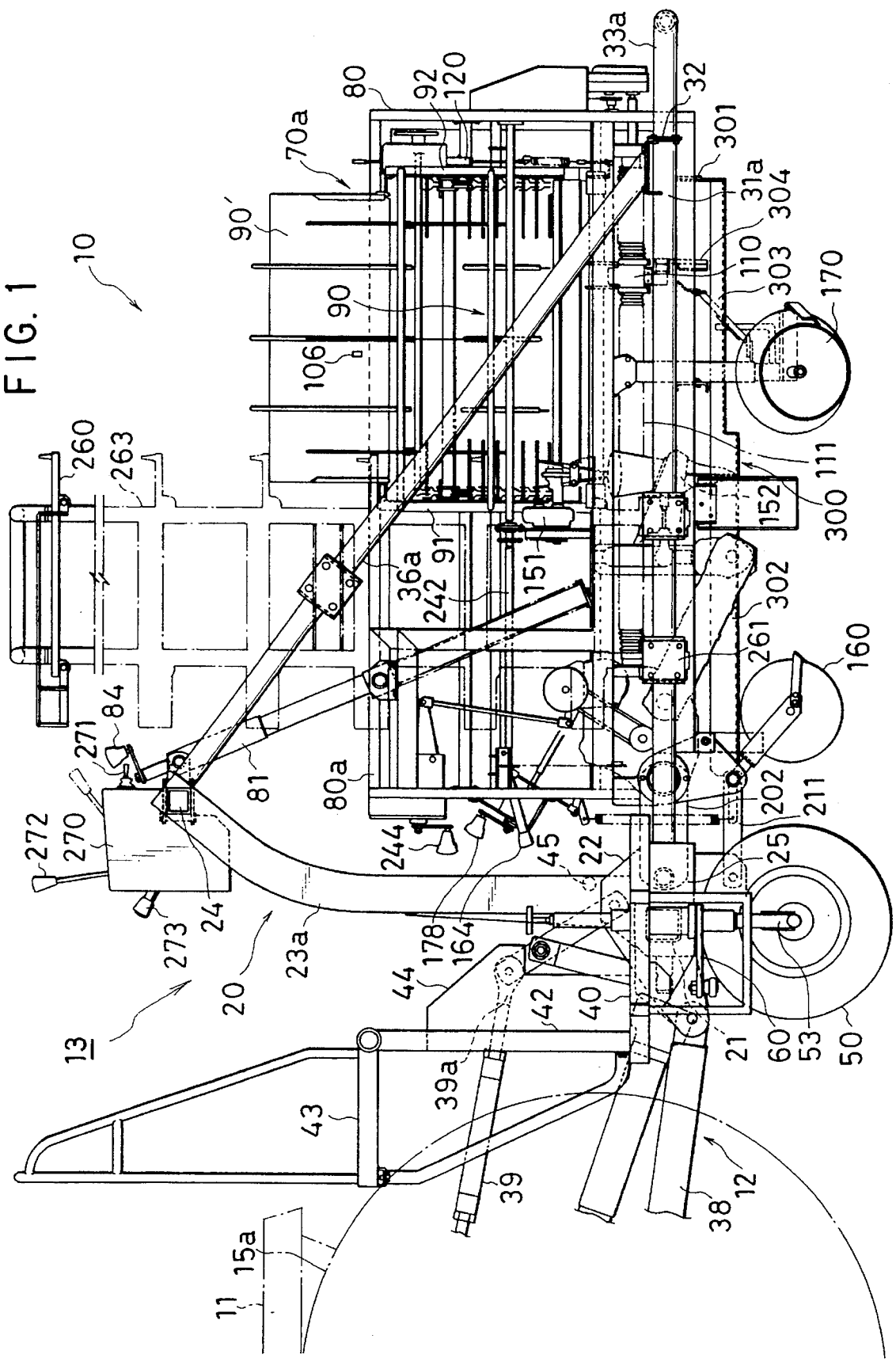
FIG. 1 is a schematic side view of the body of the seedling planting apparatus.
Figure 2:
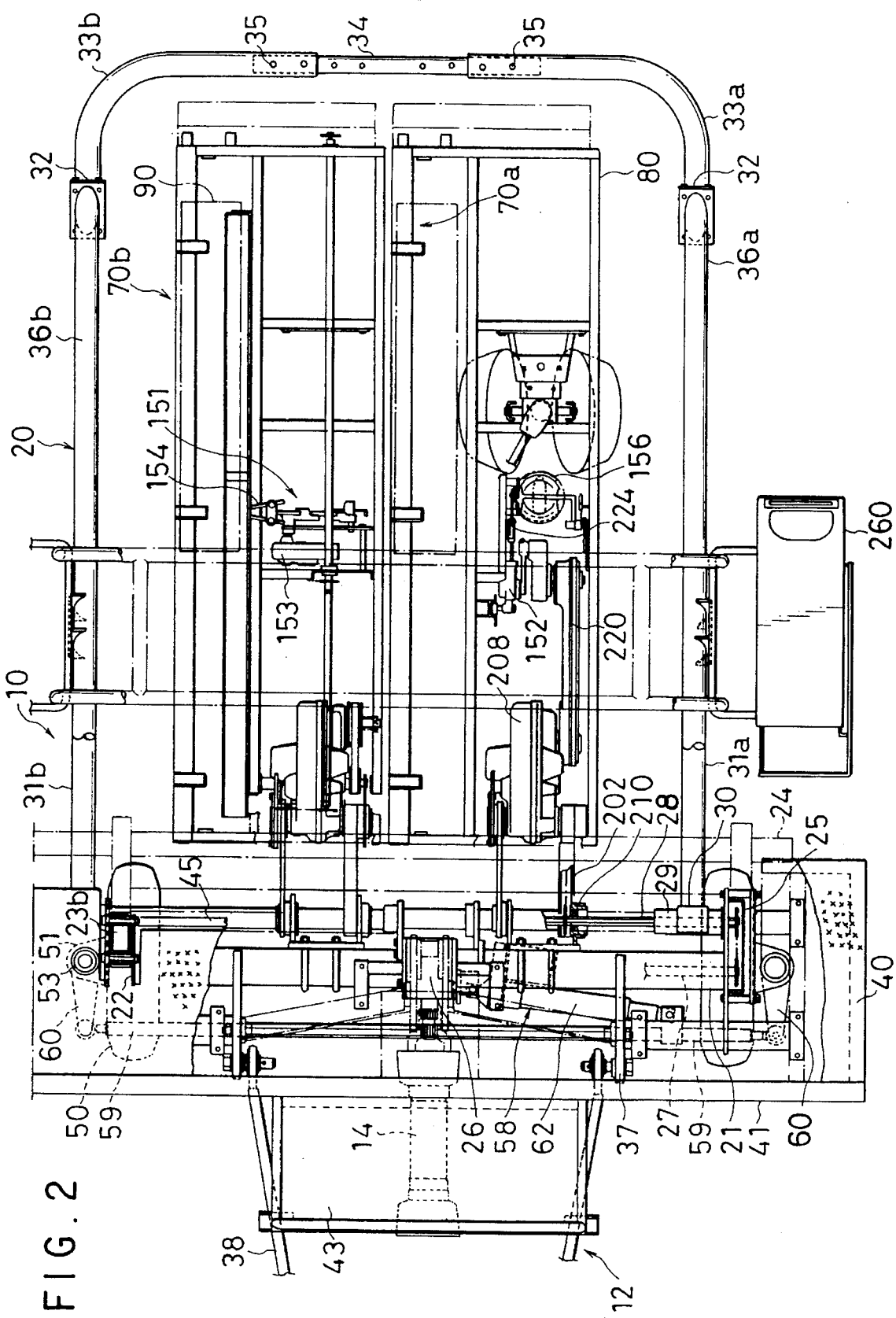
FIG. 2 is a schematic plan view of the body of the seedling planting apparatus.
Figure 3:
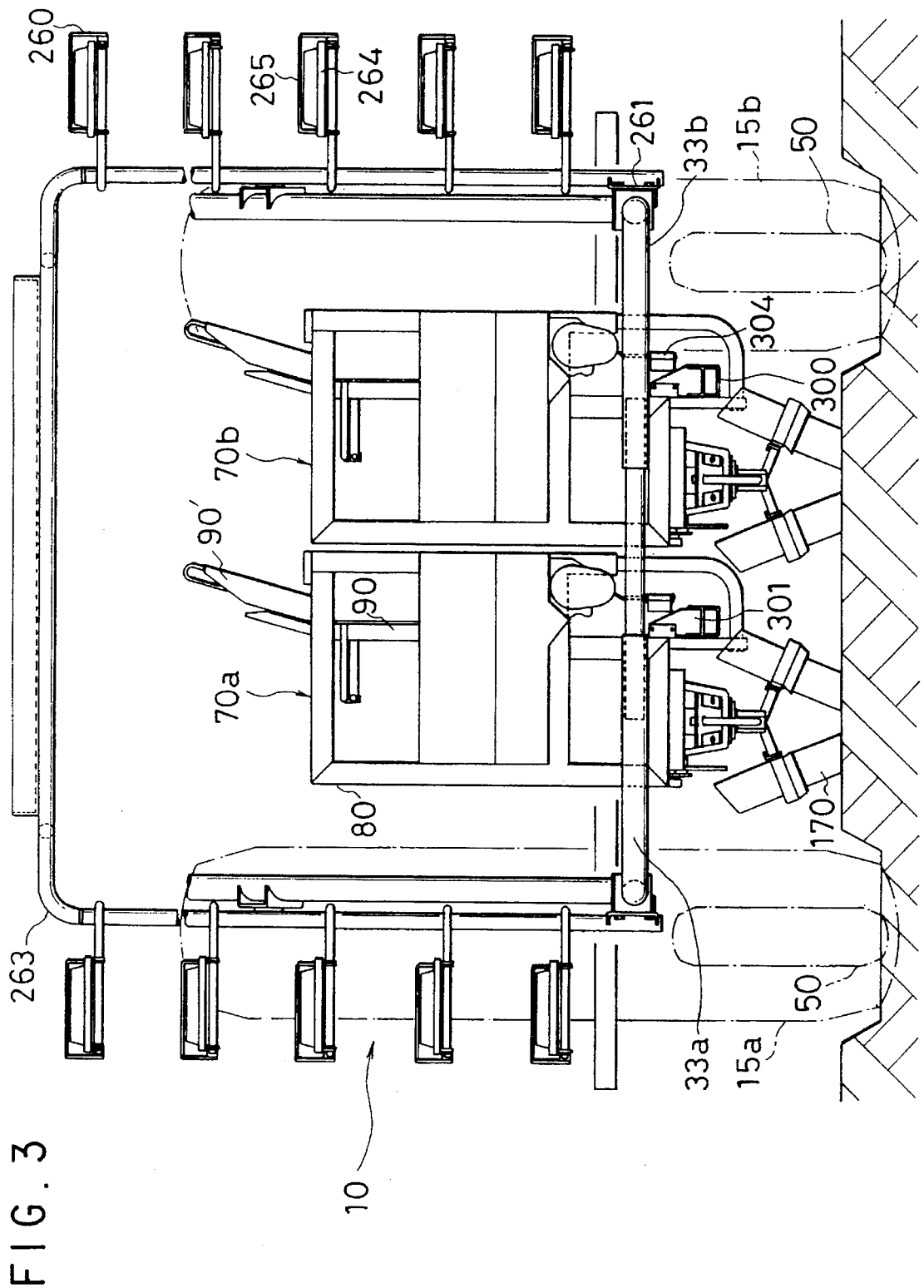
FIG. 3 is a schematic rear view of the body of the seedling planting apparatus.

FIG. 1 is a fragmentary side view of a body of a seedling planting apparatus which is an embodiment of the present invention, and FIGS. 2 and 3 are fragmentary plan and rear side views respectively.

As shown in FIGS. 1 and 2, the body of the seedling planting apparatus generally indicated by a reference numeral 10 which is an embodiment of the present invention is connected through a three-point linkage mechanism 12 to a tractor 11 which provides a traveling vehicle, and a seedling planting apparatus 13 consists of the body 10 and the tractor 11.

The body 10 includes a main frame 20. The main frame 20 is mounted on the front portion of the body 10 and includes a member 21 made of a rectangular pipe, and columns 23a and 23b mounted on the both sides of the member 21 by a bracket 22 and made of a rectangular pipe. The upper ends of the columns 23a and 23b are connected with respect to each other by a pipe 24.

A left side chain case 25 is fixedly mounted on the left end of the member 21. A gear box 26 is fixedly mounted on the center portion of the member 21 and the power transmitted from a PTO shaft 14 of the tractor 11 to the gear box 26 is transmitted to a driving shaft 27 located within the member 21, and further, from the driving shaft 27 through the chain case 25, transmitted to a hexagonal shaft 28, described later.

Connecting pipes 29 are provided behind the chain case 25 and the hexagonal shaft 28 for transmitting the power from the chain case 25 to planting units 70, described later, is housed within the connecting pipes 29. Straight pipes 31a and 31b are connected with the pipes 29 by brackets 30 respectively. Bend pipes 33a and 33b are mounted on the pipes 31a and 31b by fittings 32 respectively. As shown in FIG. 2, pipes 34 are adapted to be telescopically introduced into the ends of the bend pipes 33a and 33b respectively and secured by bolts 35 so that the lateral position of the pipes 31a and 31b can be adjusted to control the interval between two rows of the planting, described later.

As shown in FIG. 1, the columns 23a and 23b are curved to the rear direction and the upper ends of the columns 23a and 23b are connected with the pipes 31a and 31b by braces 36a and 36b respectively.

As shown in FIGS. 1 and 2, the main frame 20 is connected with the tractor 11 through the three-point linkage 12 by connecting a lower link 38 and a top link 39 of the tractor 11 to a link bracket 37 mounted on the member 21.

As shown in FIGS. 1 and 2, an operating platform 40 is mounted on the member 21 through a supporting frame 41. The operating platform 40 extends outward of the pipes 31a and 31b to widen the operation space. A netting 42 forming a safety guard is provided on the front end of the platform 40 and a seat 43 for an operator is provided on the center of the upper end of the netting 42. The seat 43 is located so that the operator can turn his back upon to sit down the seat 43. The seat 43 is disposed above the three-point linkage mechanism 12 connecting the body 10 with the tractor 11, and a case 44 for covering a link hitch 39a of the leading end of the top link 39 which projects rearward of the netting 42 is provided below the seat 43.

Further, the seat 43 is disposed between the rear wheels 15a and 15b to provide the compact apparatus 13. A stopper 45 for preventing the operator from slipping is provided on the rear end of the platform 40 and the both ends of the stopper 45 are secured to the columns 23a and 23b respectively.

As shown in FIGS. 1, 6A and 6B, a pair of gauge wheels 50 are mounted on the bracket 51 each secured to the both ends of member 21 so as to be adjusted vertically. In other words, a hollow member 53 is rotatably mounted on the bracket 51 through a thrust bearing 52. A pipe 55 having a diameter smaller than the internal diamater of the hollow member 53 is secured to a shaft 54 of the gage wheels 50 and a plurality of screw holes 56 is formed on the pipe 55. When the gauge wheels 50 is mounted on the main frame 20, the pipe 55 is inserted into the hollow member 53 and the pipe is secured by screws 57 so that the gauge wheels 50 is located to a desired height. In this manner, the gauge wheels 50 is arranged such that it can be rotated and be adjusted vertically. Further, as shown in FIG. 6A, a control mechanism 58 is provided on the gauge wheels 50. The control mechanism 58 includes a tie rod 59 located between the right and left side wheels 50, an arm 60 connecting the end of the tie rod 59 and the hollow member 53, and an extensible means 62 having a loading and pivoted to the end of the tie rod 59 and a rear end pivoted to the center portion of the member 21. The extensible means 62 has a screw mechanism arranged such that, by a motor 61 whose electric source is battery of the tractor 11, a rod 63 is rotated to be extended and retracted. Thus, the tie rod 59 is displaced to be rotated the hollow member 53 through the arm 60 thereby steering the gauge wheels 50.

Further, in FIG. 6A, each of the gauge wheels 50 is located inside of the hollow member 53 respectively. However, it may be located outside thereof. If each of the gauge wheels 50 is located outside of the hollow member 53, it is possible to locate three planting units 70 side by side, described later. Such a modification of the arrangement of the gauge wheels 50 is generally carried out together with the modification of the position of the right and left planting units 70 for the change of the interval between the planting rows, the modification of the planting condition, etc.

As shown in FIG. 3, two planting units 70a and 70b are located side by side so that the two rows planting of the seedlings can be effected. These planting units 70a and 70b are identical with respect to each other, and thus, the planting unit 70a will be described.

As shown in FIGS. 1 and 2, the planting unit 70a includes an unit frame 80 mounted on the pipe 24 to be moved vertically through the mechanism 81, and a table 90 on which the seedling trays M are placed, described later in detail, and the table 90 is arranged so as to be slidably moved along the unit frame 80. The planting unit 70a also includes a traverse or horizontal feeding mechanism 110 for moving the table 90 back and forth, a longitudinal or vertical feeding mechanism 120 for moving the seedling tray M pitch by pitch when the table 90 is moved to a right or left terminal position thereof, a seedling picker driving mechanism 151 for driving a pair of seedling picker claws 154, described later, a seedling planting claws driving mechanism 152 for driving seedling planting claws 156 to receive the seedling from the seedling picker claws 154 and plant it in the field, wheels 160 located in the front portion of the unit frame 80 for leveling the ground before the seedlings are planted, and wheels 170 located in the rear portion of the unit frame 80 for covering the planted ground with soil.

As shown in FIG. 1, the seedling picker driving mechanism 151 is located above the seedling planting claws driving mechanism 152. However, for convenience, in FIG. 2, the seedling picker driving mechanism 151 is shown in conjunction with the seedling planting unit 70a and the the seedling planting claws driving mechanism 152 is shown in conjunction with the seedling planting unit 70b.

Figure 7:
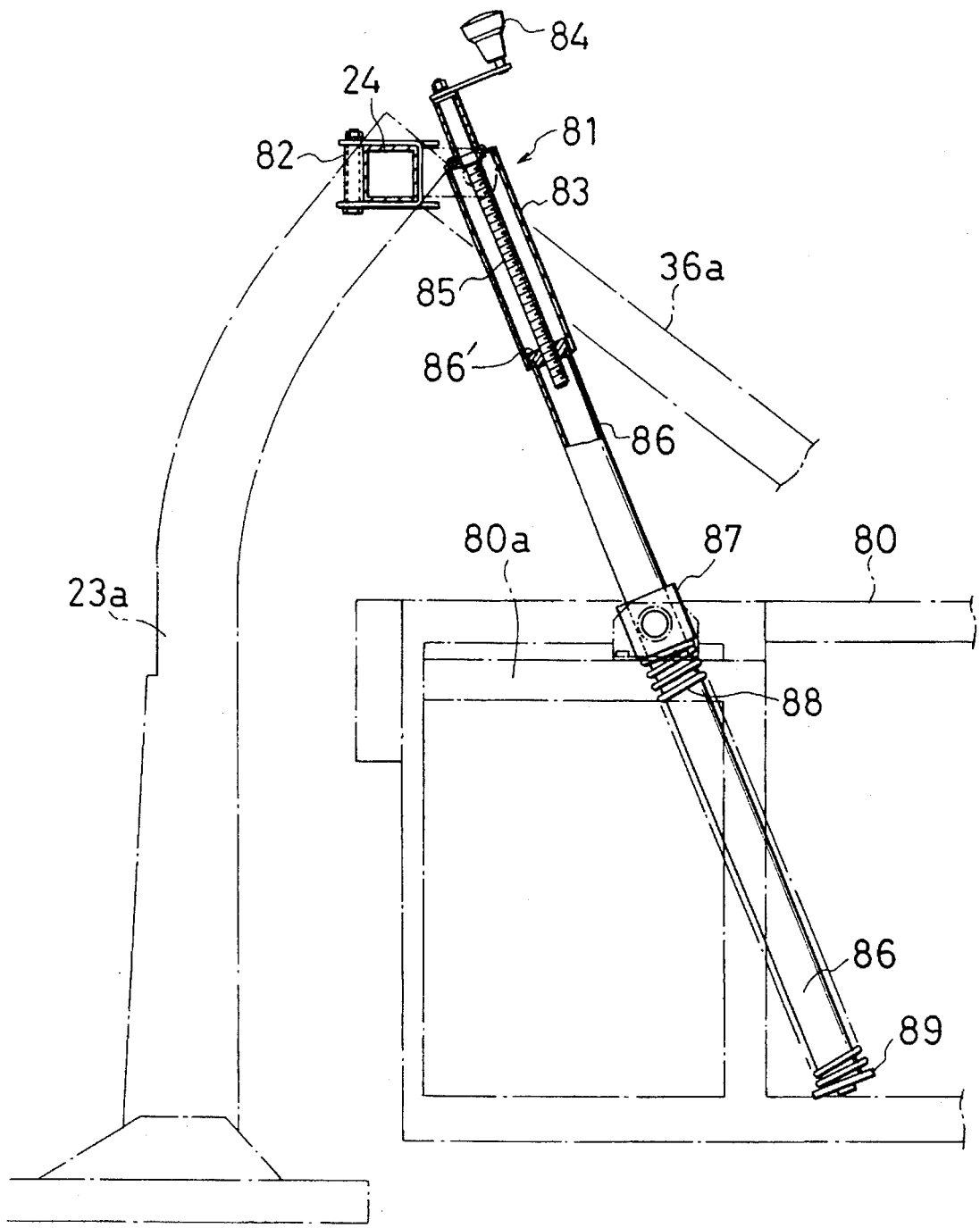
FIG. 7 is a sectional view showing the raising and lowering mechanism of the unit frame.

As best shown in FIG. 7, the raising and lowering mechanism 81 includes a bracket 82 mounted on the pipe 24, a hollow member 83 having an upper end pivoted to the bracket 82, a threaded shaft 85 inserted into the hollow member 83 and provided at its upper end with a raising and lowering handle 84, a pipe 86 inserted into the hollow member 83 and having a portion 81' screwed onto a threaded shaft 85, a hollow member 87 pivoted to the upper member 80a of the unit frame 80 and extending through the pipe, and a spring 88 between a bearer 89 provided on the lower end of the pipe 86 and the hollow member 87. Because, as mentioned above, the planting unit 70a is mounted on the unit frame 80 to be moved vertically through the raising and lowering mechanism 81, the handle 84 is operated to control the load exerted on the wheels 170, and thus, the pressure applied to the ground by the wheels 170 can be adjusted.

Figure 8A:
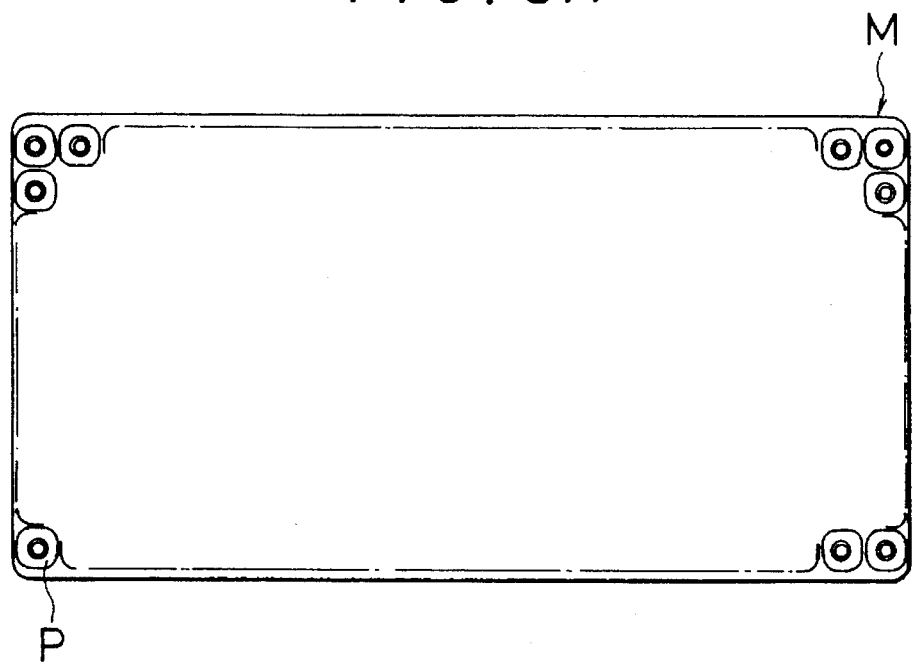
FIG. 8A is a plan view of the seedling tray and FIG. 8B is a sectional view showing a part of the seedling tray.
Figure 8B:
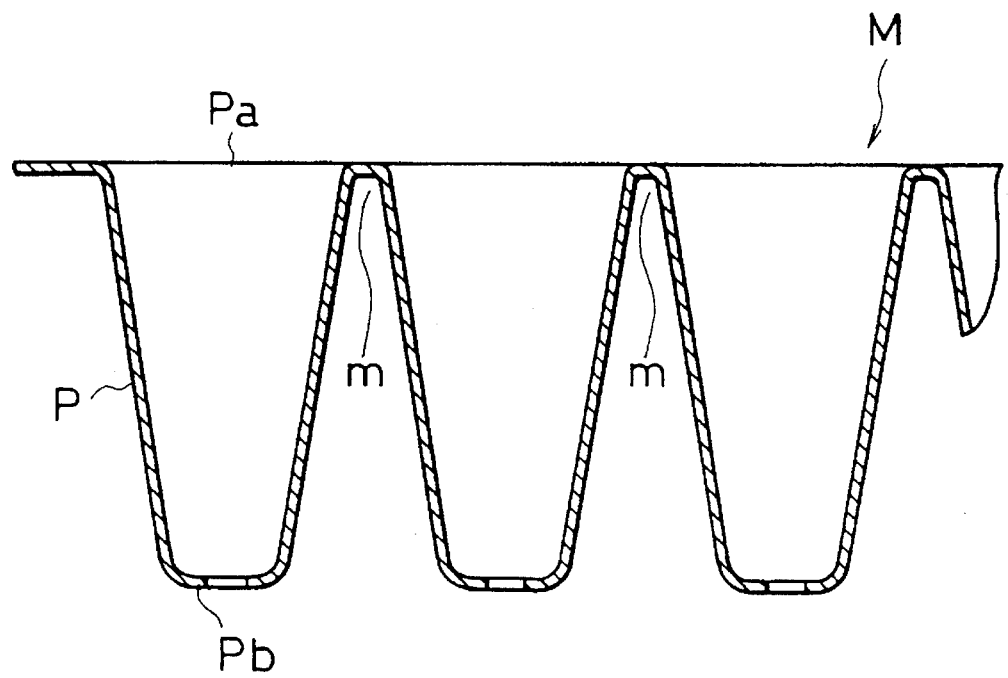

As shown in FIG. 8B, the seedling tray M is formed with multiple cells P divided at a constant dimension or dimensions longitudinally and transversely. Each of the cells is shaped to gradually taper off from its upper opening portion $P_a$ towards its bottom portion $P_b$, and thus, grooves m are formed between each cell.

Figure 19:
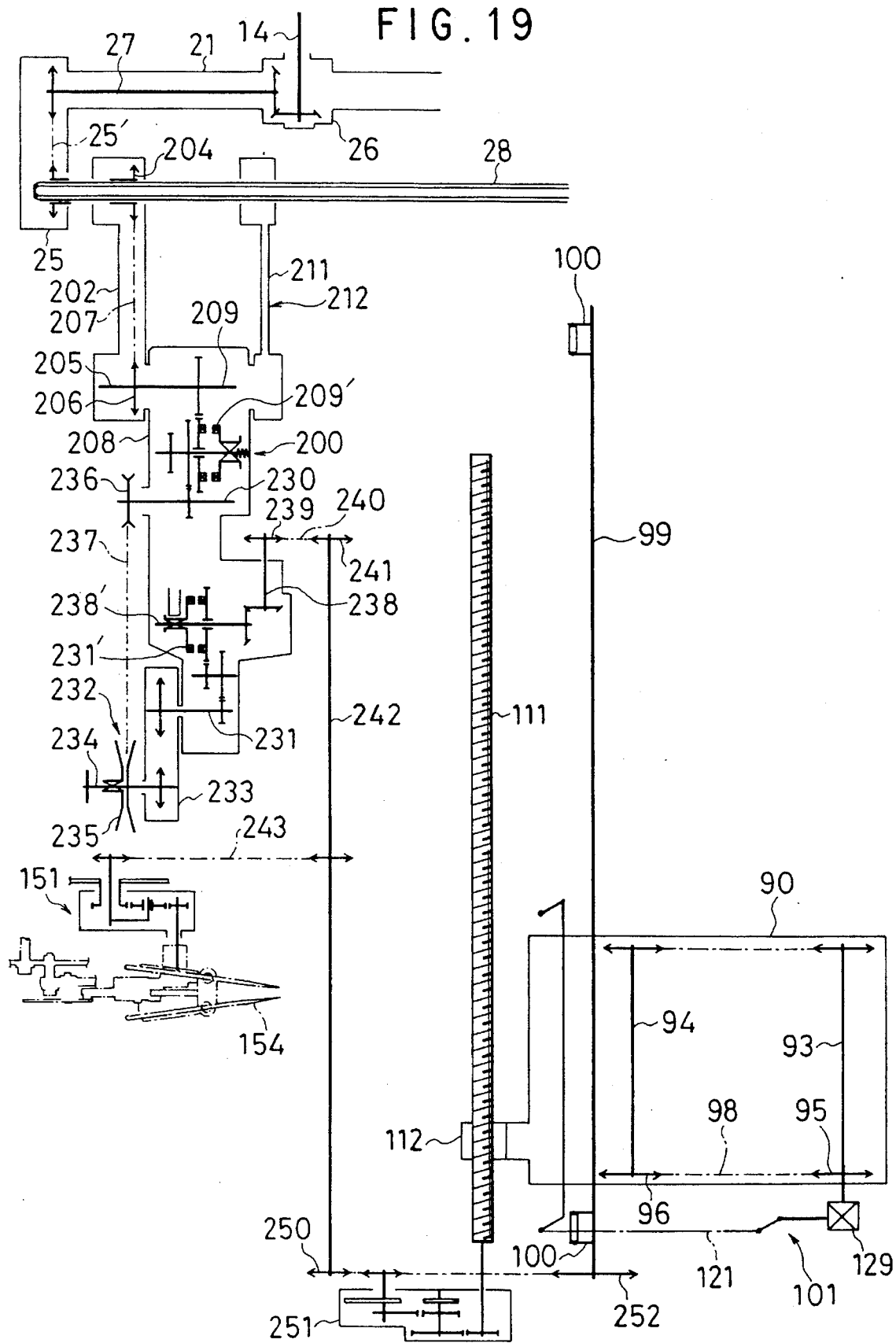
FIG. 19 is a view showing the power transmitting system of the travers feeding mechanism, the longitudinal feeding mechanism and the seedling picker claws driving mechanism.

As shown in FIG. 19, the traverse feeding mechanism 110 includes a traverse feeding shaft 111 rotatably mounted on the unit frame 80 and the traverse feeding shaft 111 is formed with internal thread 111a. Power is input to the traverse feeding shaft 111 by a mechanism, described later. On the other hand, a fitting 112 is secured to the table 90 and external thread engaging with the internal thread 111a in the traverse feeding shaft 111 is mounted on the fitting.

According to the above construction, the traverse feeding shaft 111 rotates, the external thread engaged with the internal thread 111a in the traverse feeding shaft 111 is moved transversely, whereby the table 90 is moved transversely.

Figure 9:
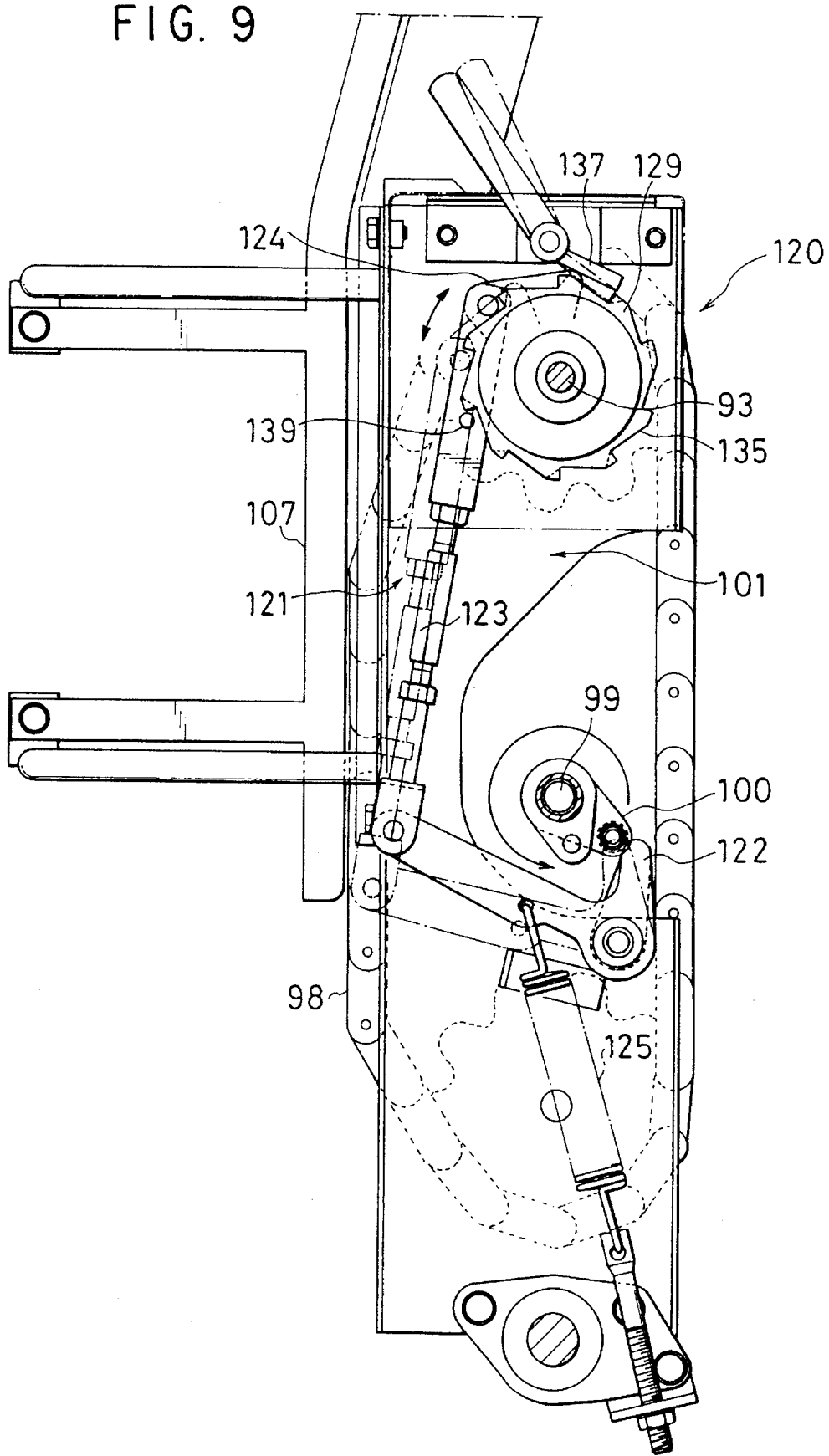
FIG. 9 is a view showing the ratchet and linkage mechanism in the longitudinal feeding mechanism.

As shown in FIG. 9, the longitudinal feeding mechanism 120 includes a longitudinal feeding drive shaft 99 which is rotatably mounted on the unit frame 80 in parallel with the traverse feeding shaft 111 and rotates constantly during the planting operation, and a longitudinal feeding drive unit 101 for transmitting the rotational driving force from the drive shaft 99 to a longitudinal feeding drive sprocket 95 described later. A pair of longitudinal feeding actuators 100 are mounted on the both ends of the drive shaft 99 through brackets and bolts respectively. Preferably, each of the longitudinal feeding actuators 100 is formed as a cylindrical roller.

Figure 10:
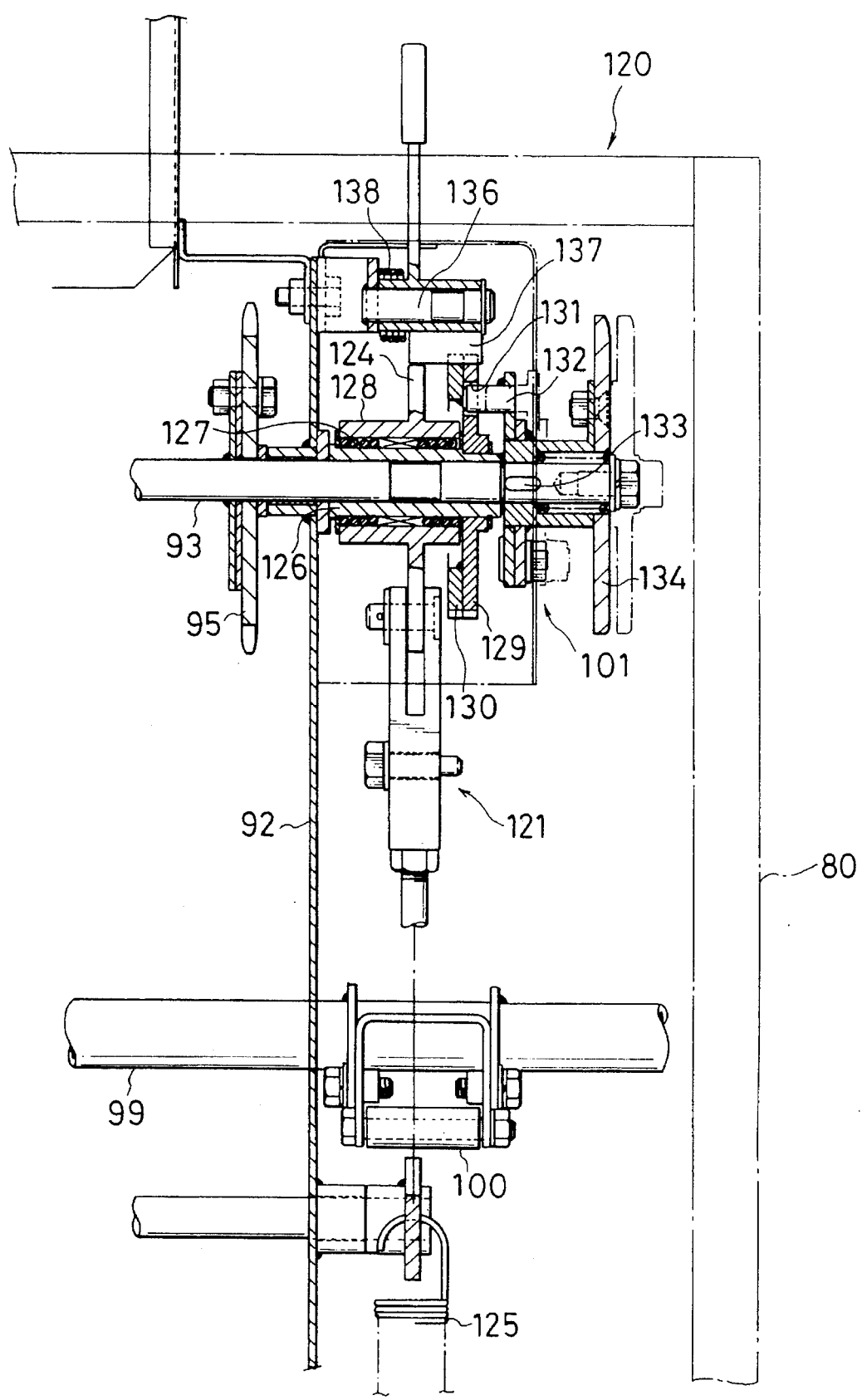
FIG. 10 is a sectional view of the longitudinal feeding mechanism.

As shown in FIGS. 9 and 10, the longitudinal feeding drive unit 101 includes a linkage mechanism 121 consisting of a first lever 121 provided at its one end with a projection 122a engaging with the longitudinal feeding actuators 100, an intermediate portion 123 having one end pivoted to the other end of the first lever 122, and a second lever 124 having one end pivoted to the other end of the intermediate portion 123. A spring 125 is mounted on the first lever 122 and thus, the first lever 122 is pulled downwardly in FIG. 9. As shown in FIG. 19, the longitudinal feeding drive unit 101 also includes a longitudinal feeding shaft 93 rotatably mounted between a front plate 91 and a rear plate 92 in the table 90. A boss 126 is mounted on the longitudinal feeding shaft 93 so as to be rotated with respect to the shaft 93.

A hollow shaft 128 is fitted within the boss 126 through a one-way clutch 127, and thus, the boss 126 and the hollow shaft 128 engage with respect to each other only in the direction to which the seedling tray M is fed longitudinally. Further, a ratchet 129 and an auxiliary ratchat 120 are fixedly mounted on the boss 126. A clutch lever 134 fixedly mounted on the longitudinal feeding shaft 93 through a key 133 and a pin 132 provided on the clutch lever 134 is adapted to be inserted into an aperture 131 in the ratchet 129. The ratchet 129 is provided at its peripherally edge with a lock groove 135. A stopper pawl 137 is pivoted to the rear plate 92 in the table 90 through a shaft 136 and is biased to engage with the lock groove 135 constantly by a spring 138 provided on the shaft 136. On the other hand, the second lever 124 in the linkage mechanism 121 is adapted to be operatively connected to the hollow shaft 128, and further, during the operation of the linkage mechanism 121, the leading end of the second lever 124 abuts on the underside of the stopper pawl 137 to be out of engagement with the lock groove 135.

The thus constituted longitudinal feeding mechanism 101 operates as follows. When the table 90 is moved by the traverse feeding mechanism 110 to arrive at either of its terminal positions, the corresponding longitudinal feeding actuator 100 of the drive shaft 99 engage with the first lever 123 of the linkage mechanism 121 to rotate them counterclockwise in FIG. 9, whereby the hollow shaft 128 is rotated by the second lever 124 but rotated with respect to the longitudinal feeding shaft 93 due to the presence of the one-way clutch 127. At the same time, the leading end of the second lever 124 abuts on the underside of the stopper pawl 137 to disengage the stopper pawl 137 from the lock groove 135 thereby causing the ratchet 129 to be rotated freely in the longitudinal feeding direction of the seedling tray M. In this condition, when the first lever 123 of the linkage mechanism 121 disengages from the longitudinal feeding actuator 100, the linkage mechanism 121 is returned to its original position by the spring 125, and thus, the hollow shaft 128 operatively connected with the second lever 124 is rotated clockwise in FIG. 9 thereby rotating the ratchet 129 through the one-way clutch 127 and the boss 126. Therefore, the longitudinal feeding shaft 93 is rotated clockwise through the pin 132 and the clutch lever 134.

Figure 11:
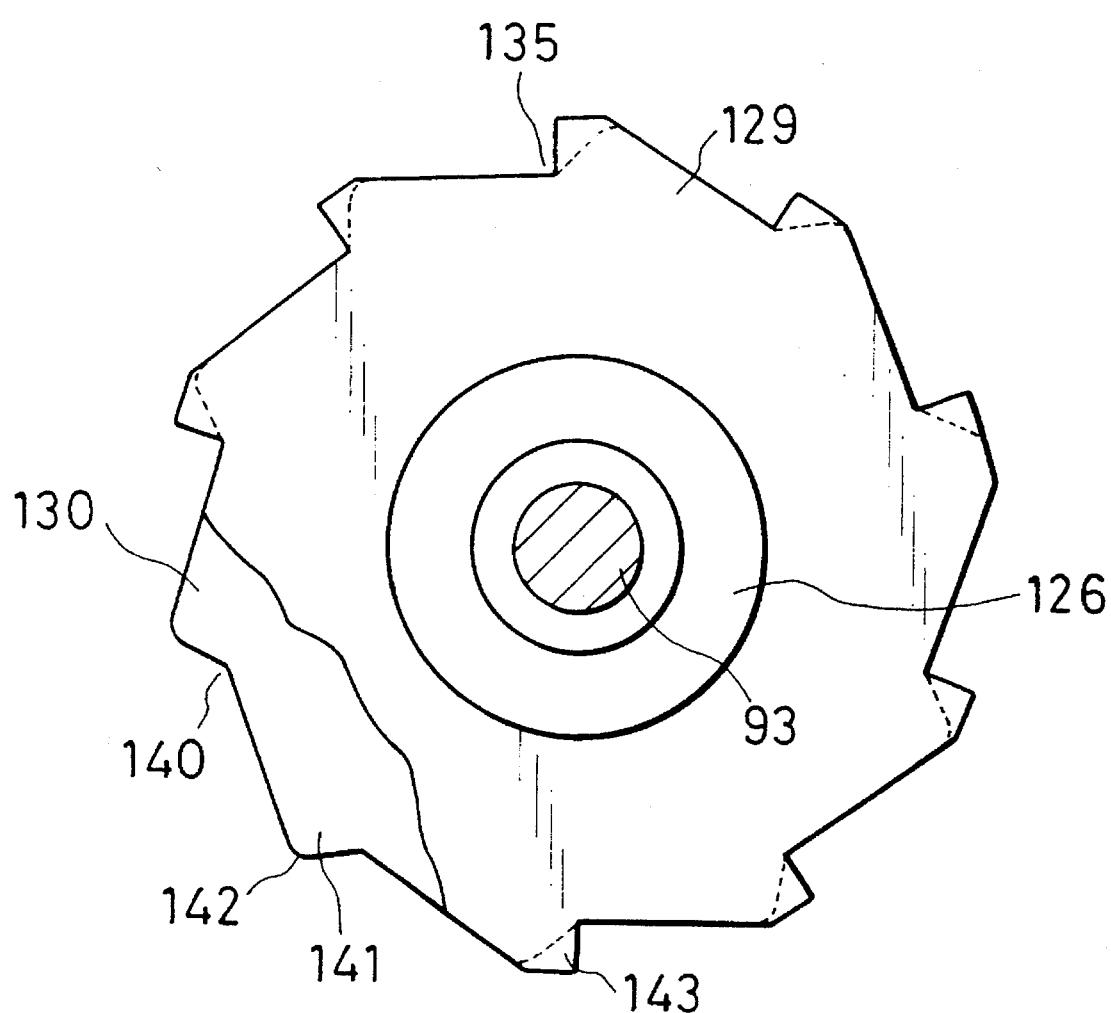
FIG. 11 is a view showing the ratchet and the auxiliary ratchet in the longitudinal feeding mechanism.

On the other hand, as shown in FIG. 9, the linkage mechanism 121 is provided with a stopper pin 139 which is adapted to engage with the lock groove 140 provided on the peripheral edge of the auxiliary ratchet 130. Further, as shown in FIG. 11, the height of top portion 142 of a lock cam 141 in the auxiliary ratchet 130 is lower than that of a lock cam 143 in the ratchet 129 and the top portion of the former is fromed to facilitate the sliding of the stopper pin 139. Thus, when the locking of the ratchet 129 provided by the stopper pawl 137 is released, the ratchet 129 tends to rotate counterclockwise in FIG. 9 due to the weight of the seedling tray M.

Because the stopper pawl 139 engages with the lock groove 140 in the auxiliary ratchet 130, however, the rotation of the ratchet 129 is prevented. On the other hand, when the linkage mechanism 121 is biased downwardly by the spring 125 to be rotated the ratchet 129 counterclockwise in FIG. 9, the ratchet 129 is rotated counterclockwise, because the stopper pin 139 gets over the top portion 142 of the lock cam 141 in the auxiliary ratchet 130.

Figure 13A:
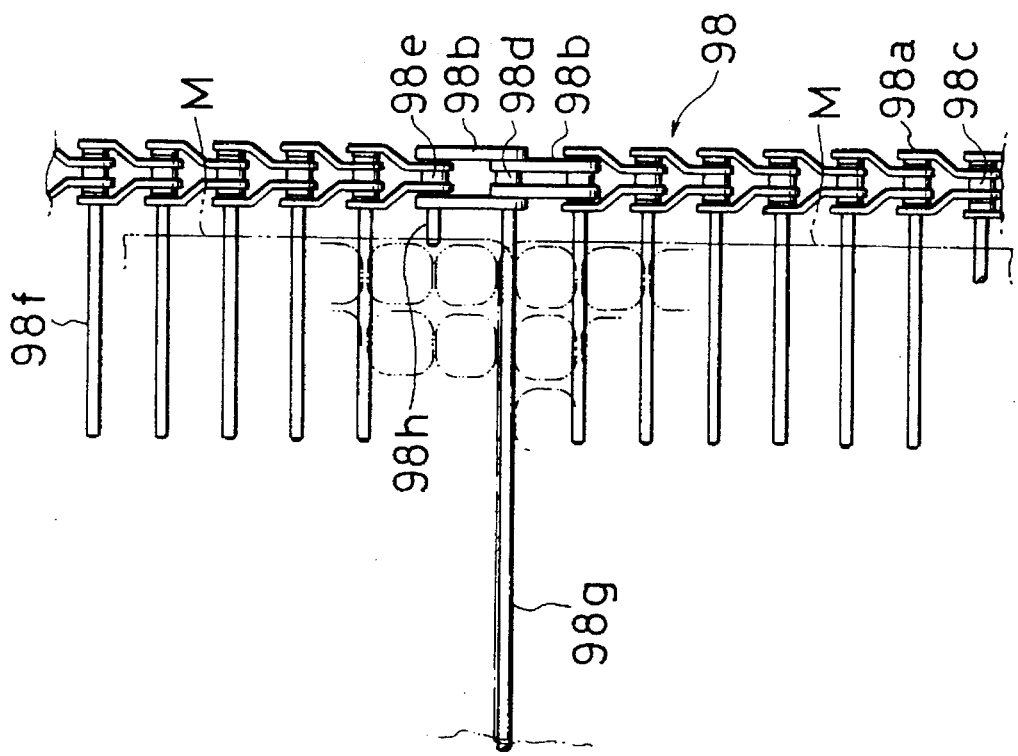
FIG. 13A is a view showing the detail of the endless chain in the longitudinal feeding mechanism and FIG. 13B is a view showing the condition wherein the seedling tray is placed in the endless chains.

As shown in FIG. 12, a driver sprocket shaft 94 is rotatably mounted on the unit frame 80. As shown in FIGS. 10, 12 and 19, longitudinal feeding driving sprockets 95 are mounted on the both ends of the longitudinal feeding shaft 93, while driven sprockets 96 are mounted on the both ends of the driven sprocket shaft 94. Endless chain 98 provided with longitudinal feeding pins 98f adapted to be fitted within each groove m is hung between the sprockets 95 and 96. As shown in FIGS. 12 and 13A, multiple chain pieces 98a are connected with respect to each other by a pin 98c to form the endless chain 98 for effecting the longitudinal feeding of the seedling tray M. At three portions of the endless chain 98, a second chain piece 98b having a length longer than that of the chain piece 98a are provided in place of the chain piece 98a respectively. As shown in FIG. 13A, the chain pieces 98b are connected with respect to each other by a pin 98d and the chain piece 98b is connected with the chain piece 98a by a pin 98e. Rods 98f each having a predetermined length are mounted on the inner sides of the pins 98c respectively. Further, the pin 98d in the endless chain 98 located in one side is connected with the corresponding pin 98d in the endless chain 98 located in the other side by a rod 98g. As shown in FIG. 13A, a rod 98h mounted on the inner side of the pin 98e located at the opposite side of the progress direction, is shorter than the rod 98f.

Figure 13B:
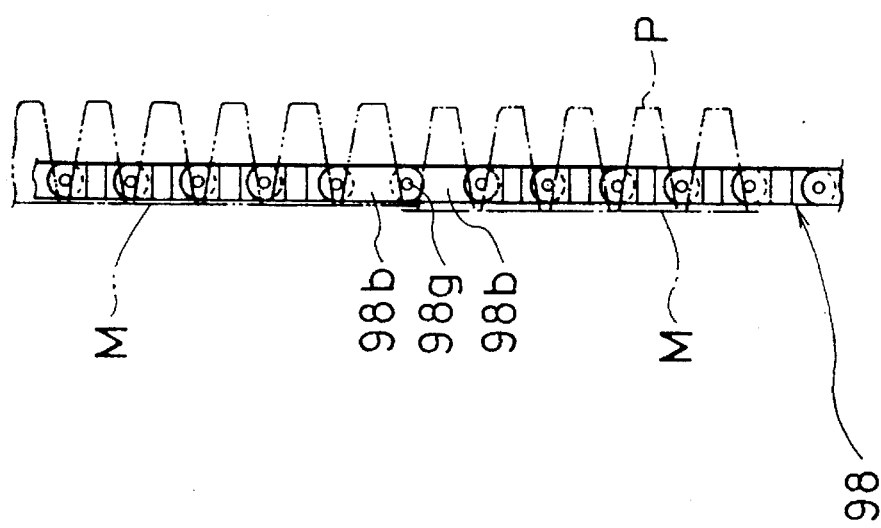

FIG. 13B shows the condition wherein the seedling tray M is located on the endless chains 98. The seedling tray M is located on the endless chains 98 so that the first row of the cell P is supported by the rod 98g and each of the pin 98f is engaged within each of the grooves m. Each of the length of the front and rear flanges is longer than the distance between each pot but the difference in length between these flanges and each pot is absorbed, because the length of the chain piece 98b is longer than that of the chain piece 98a. Further, there are chain piece 98a at three portion of the endless chain 98, and thus, when the endless chain 98 moves full circle, three trags M are fed longitudinally. As mentioned above, because there are chain pieces 98b at the three portion, in each of the ratchet 122 mating with the endless chain 98, longer tooth are provided at the three portion correspondingly.

When the seedling tray M is to be set on the table 90, after the clutch laver 134 is slided along the longitudinal feeding shaft 93 to remove the pin 132 from the aperture 131 in the ratchet 129, the longitudinal feeding shaft 93 is rotated through the clutch lever 134 to locate the endless chain 98 in a predetermined position thereby setting the seedling tray M on the table 90.

As shown in FIG. 12, guide plates 102 and 103 for guiding the seeding tray M after the tray M exits the table 90 are mounted on the lower end of the table. The guide plate 103 is provided on the lower end of the bottom plate so as to be flush with the bottom plate of the table 90. The guide plate 102 is spaced from the guide plate 103 so that the space corresponding to the height of the seedling tray M is retained, and the guide plate is formed at its upper end with a flange portion 104 bent laterally. The space provided between the guide plates 102 and 103 is led to a tray guide rail 300 described later. Further, in FIG. 12, the reference numeral 105 indicates a stay for mounting the guide plate 102.

Figure 14:
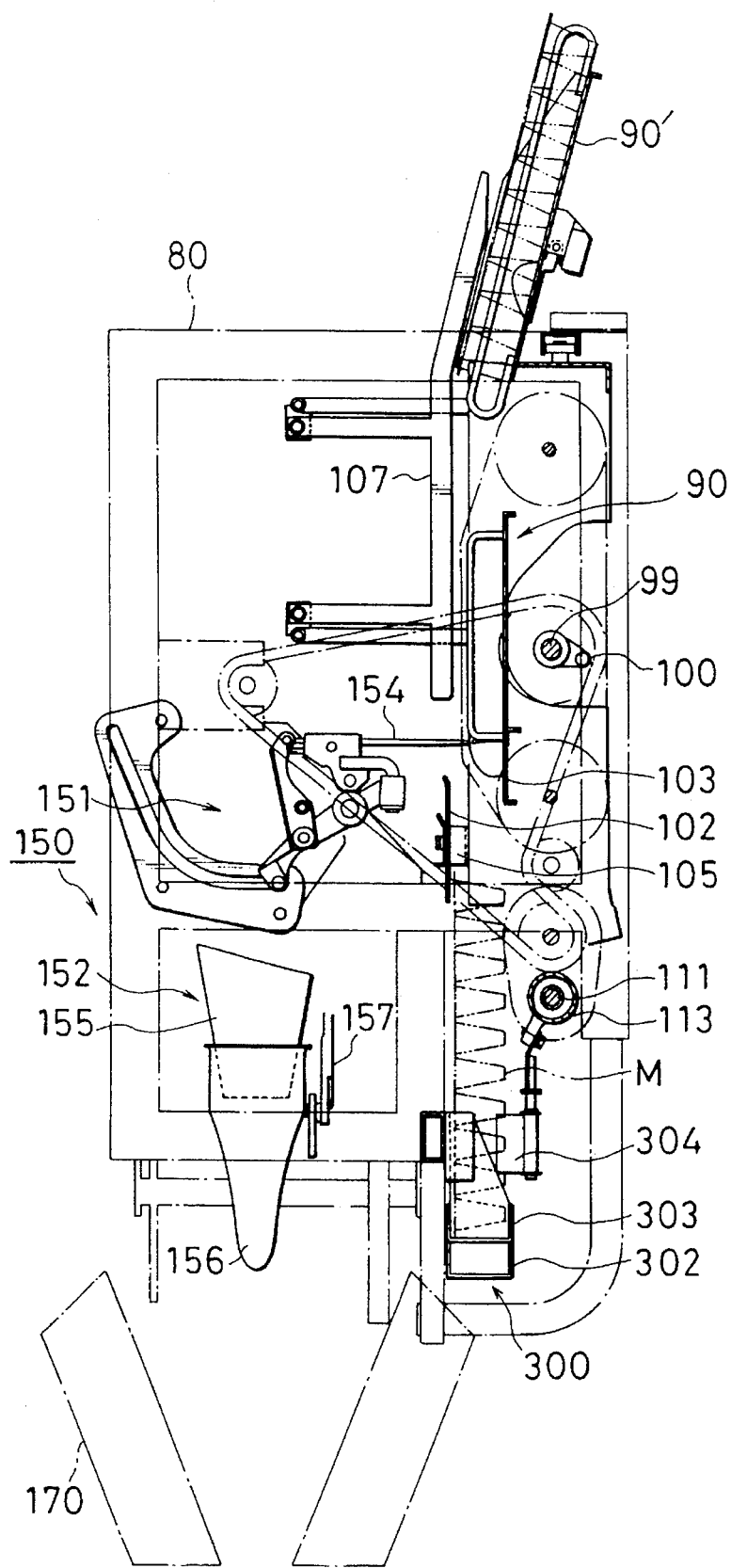
FIG. 14 is a rear view of the seedling planting unit.
Figure 15:
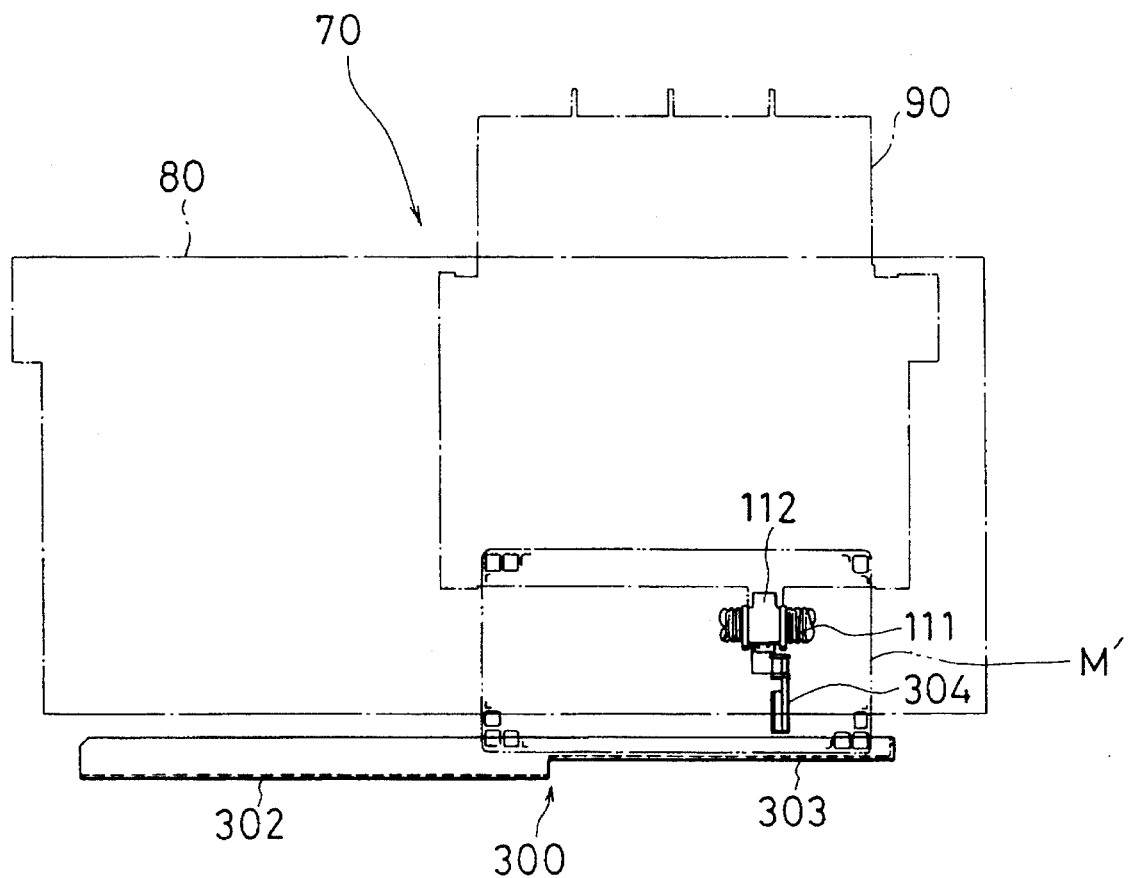
FIG. 15 is a side view of the tray guide rail.

As shown in FIGS. 1 and 14, the tray guide rail 300 is mounted on the lower portion of the unit frame 80 through brackets 301. The tray guide rail 300 has a channel-shaped section, and in the front portion 302 of the tray guide rail 300, that is, the portion proximal to the operator, the bottom surface of the tray guide rail 300 is lower than that in the rear portion 304, that is, the portion distal to the operator. The tray guide rail 300 is located below the table 90 so that the empty tray M' carried from the table 90 falls into the tray guide rail 300. As shown in FIG. 14, the traverse feeding shaft 111 is covered with a shroud 113. The shroud 113 is provided with an engaging member 304 which, during the traverse feeding of the table 90, engages with the empty tray M' to move them. The engaging member 304 is arranged such that, when the table 90 proceeds, the member 304 engages with the seedling tray M' and when the table 90 retreats, the member 304 disengage from the seedling tray M'.

If the seedling tray M becomes empty when the seedling tray M on the table 90 is located in the front portion 302 of the unit frame 80, the empty tray M' is fed downwardly by the longitudinal feedling mechanism 120 to fall into the front portion 302 of the tray guide rail 300. In this condition, if the table 90 is to be retreated, the empty tray M' is locked.

Because the empty tray M' is locked by the step made by the difference in height between the front portion 302 and the rear portion 303 and further, as mentioned above, the engaging member 304 does not perform the engaging function when the table 90 is retreated. Therefore, the empty tray M' can easily be withdrawn by the operator on the platform 40.

On the other hand, if the seedling tray M becomes empty when the tray M disposed on the table 90 is located in the rear portion 303 of the tray guide rail 300, the empty seedling tray M' is fed downwardly by the longitudinal feeding mechanism 120 to fall into the rear portion 303 of the tray guide rail 300. In this condition, if the table 90 is to be proceeded, the engaging member 304 engages with the groove m in the tray M' to move the tray M' to the front portion 302 of the tray guide rail 300, and thus, the empty seedling tray M' can easily be with drawn by the operator on the platform 40.

Even if the seedling tray M falls into either the front portion 302 or the rear portion 303, when the table 90 is retreated and then, proceeded, the rear end of the empty tray M' fallen into the front portion 302 of the guide rail 300 is pushed by the engaging member 304 to be moved to the front end of the unit frame 80 thereby being withdrawn by the operator on the platform 40. In this manner, the empty tray M' is arranged so as to be moved to the front portion of the unit frame 80, to facilitate the withdrawal of tray M' by the operator.

As shown in FIGS. 12 and 14, a second table 90' is located above the table 90 and a sensor 106 for sensing the residue seedlings in the tray M is located below the second table 90'. Further, in the side opposed to the table 90, a plurality of guides 107 for guiding the seedling tray M during the longitudinal feeding of the tray M are provided.

As best shown in FIG. 14, a seedling planting device 150 is provided adjacent to the table 90 and the device 150 includes a seedling picker driving mechanism 151 and a seedling planting claws driving mechanism 152. The seedling picker driving mechanism 151 has a transmission case 153 disposed in the central portion of the unit frame 80 and seedling picker claws 154 operatively connected to the output shaft (not shown) of the transmission case 153 through a crank mechanism. Further, the seedling planting claws driving mechanism 152 has a chute 155 disposed below the movement locus of the seedling picker claws 154, seedling planting claws 156 disposed below the chute 155 for receiving the seedling picked from the tray M by the claws 154 to plant them in the field, and a seedling planting claws arm 157 for causing the claws 156 to be pivoted. However, the seedling planting device 150 is known in itself, and thus, the detail explanation is omitted.

Figure 4:
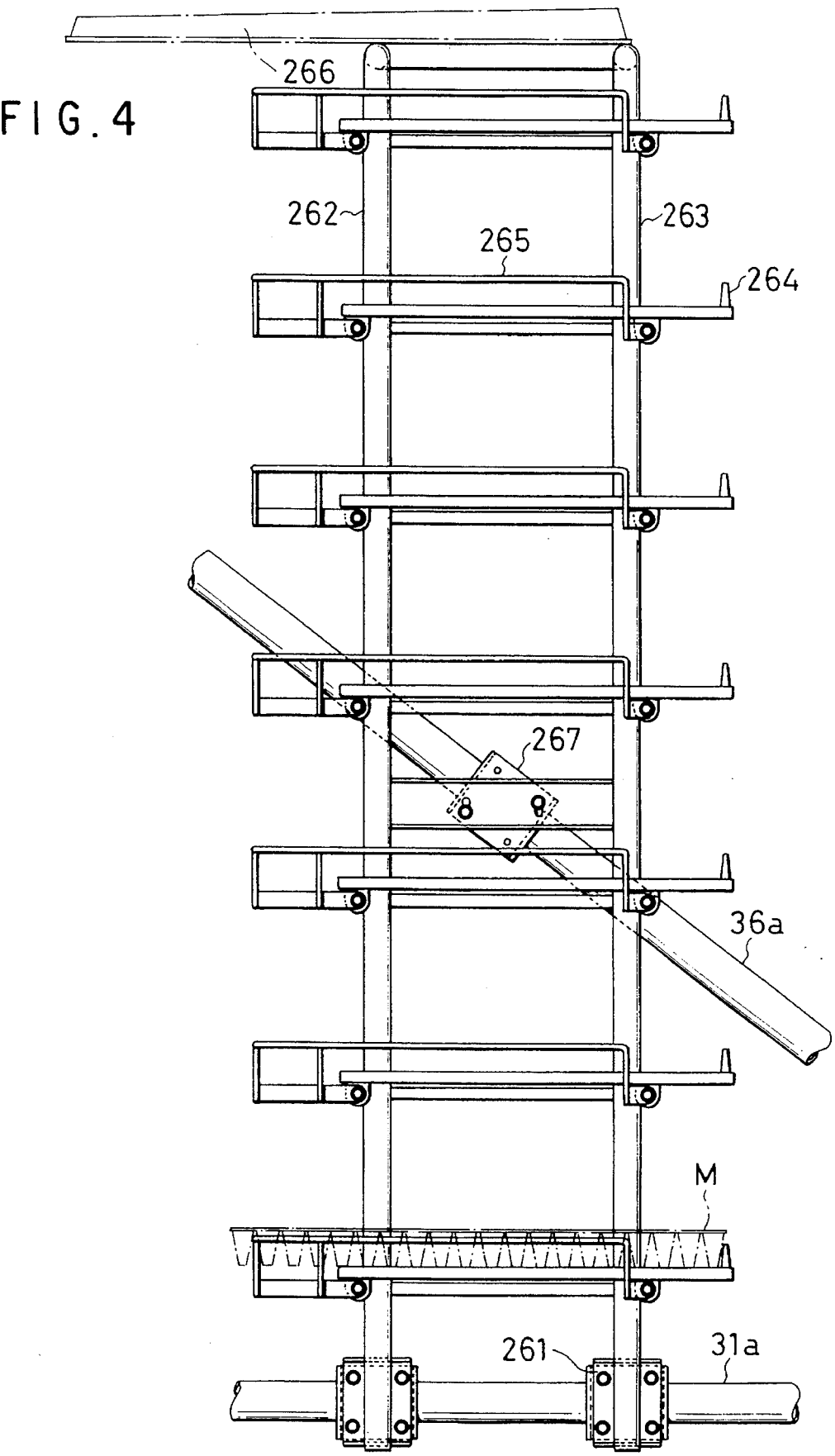
FIG. 4 is a view taken along the line 4—4 in FIG. 3.
Figure 5:
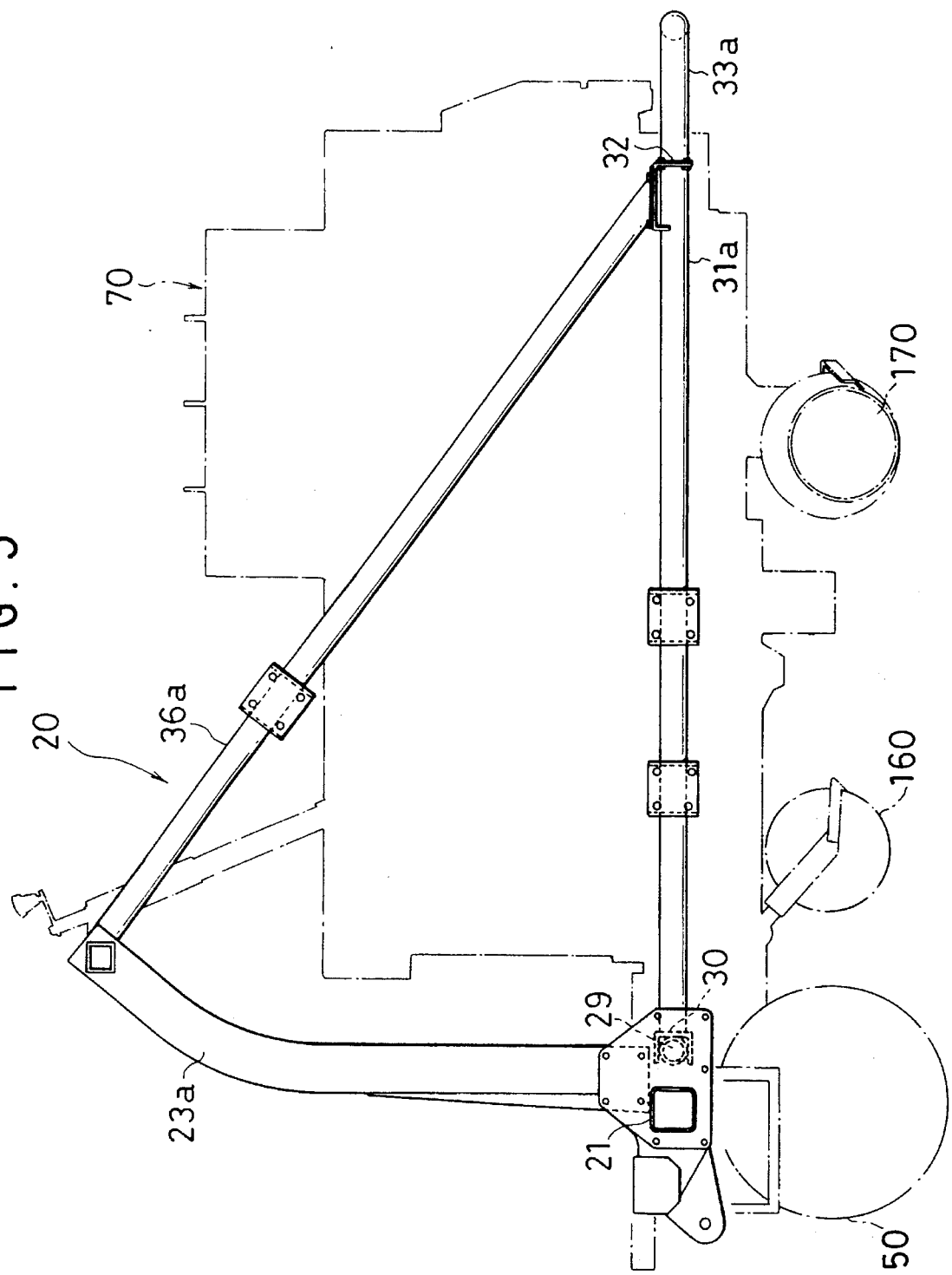
FIG. 5 is a view showing the main frame of the body of the seedling planting apparatus.

As shown in FIGS. 3 and 4, frames 262 and 263 are mounted on the pipes 31a and 31b through brackets 261 respectively to be spaced with respect to each other. Between the frames 262 and 263, a plurality of preliminary tables 260 for placing a preliminary tray M are mounted to be spaced at a certain distance vertically. The rear end of each table 260 is bent upwardly to provide a receiving piece 264. Further, a retaining frame 265 adapted to be fitted into the groove m of the tray M is provided on its outer side edge and its front portion, and thus, when the seedling tray M is placed on the preliminary table 260, the movement of the seedling tray M is prevented by the receiving piece 264 and the retaining frame 265. As shown in FIG. 4, a canopy 266 for covering above the seat 43 to provide an awning for the seat 43 is mounted on the frames 262 and 263. In FIG. 4, the reference numeral 267 indicates a member connecting the column of the frame and the braces 36a and 36b.

As shown in FIG. 1, an operating box 270 having a generally box shape is adjustably mounted on the center of the pipe 24. The operating box 270 is provided with a main planting clutch lever 172 for controlling the clutch to engage and disengage the planting unit, an unit clutch lever 273 for controlling the clutch to engage and disengage the driving portion of each planting unit, and a finger grip 271 for controlling the gauge wheels 50 described later.

The main planting clutch lever 272 and the unit clutch lever 273 are operatively connected with a shift lever of a seedling planting clutch mechanism(not shown) housed within the mission portion 200. The finger grip 271 is operatively connected with a steering mechanism 58 for effecting the steering of the gauge wheels 50. The turning direction of the finger grip 271 corresponds to the steering direction of the gauge wheels 50, while the turning degree of the finger grip 271 corresponds to the steering degree of the gauge wheels 50.

Figure 16:
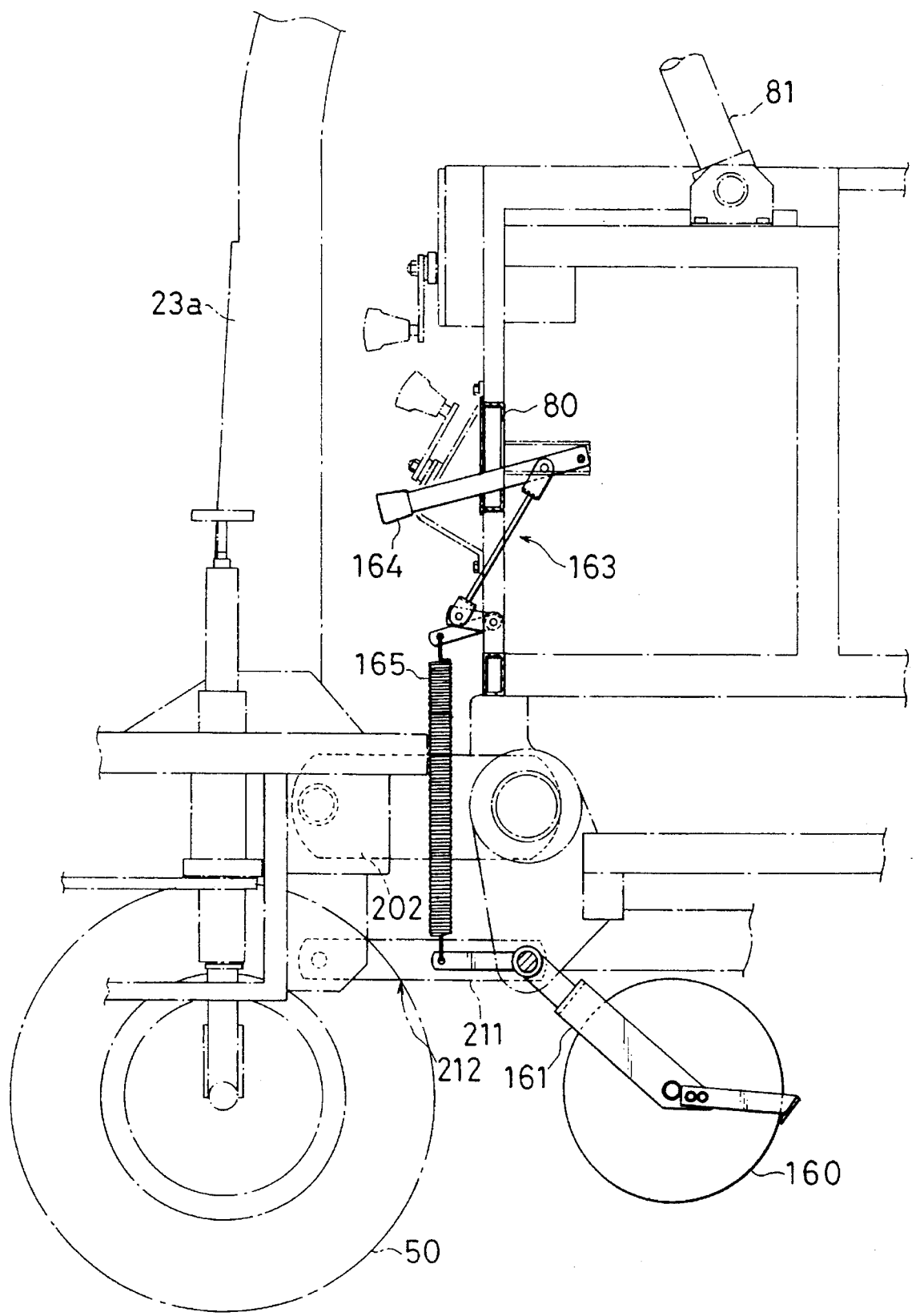
FIG. 16 is a view showing the leveling wheels.

As shown in FIG. 16, the leveling wheel 160 is rotatably mounted on a bracket 161. The bracket 161 is povoted to a member 211 of a linkage mechanism 212 provided between the main frame 20 and the unit frame 80. The leading end of the bracket 161 is operatively connected with a lever 164 operating the leveling wheel 164 through a spring 165 and a link 163. The pressure exerted by the leveling wheel 160 can be adjusted through the lever 164.

Figure 17:
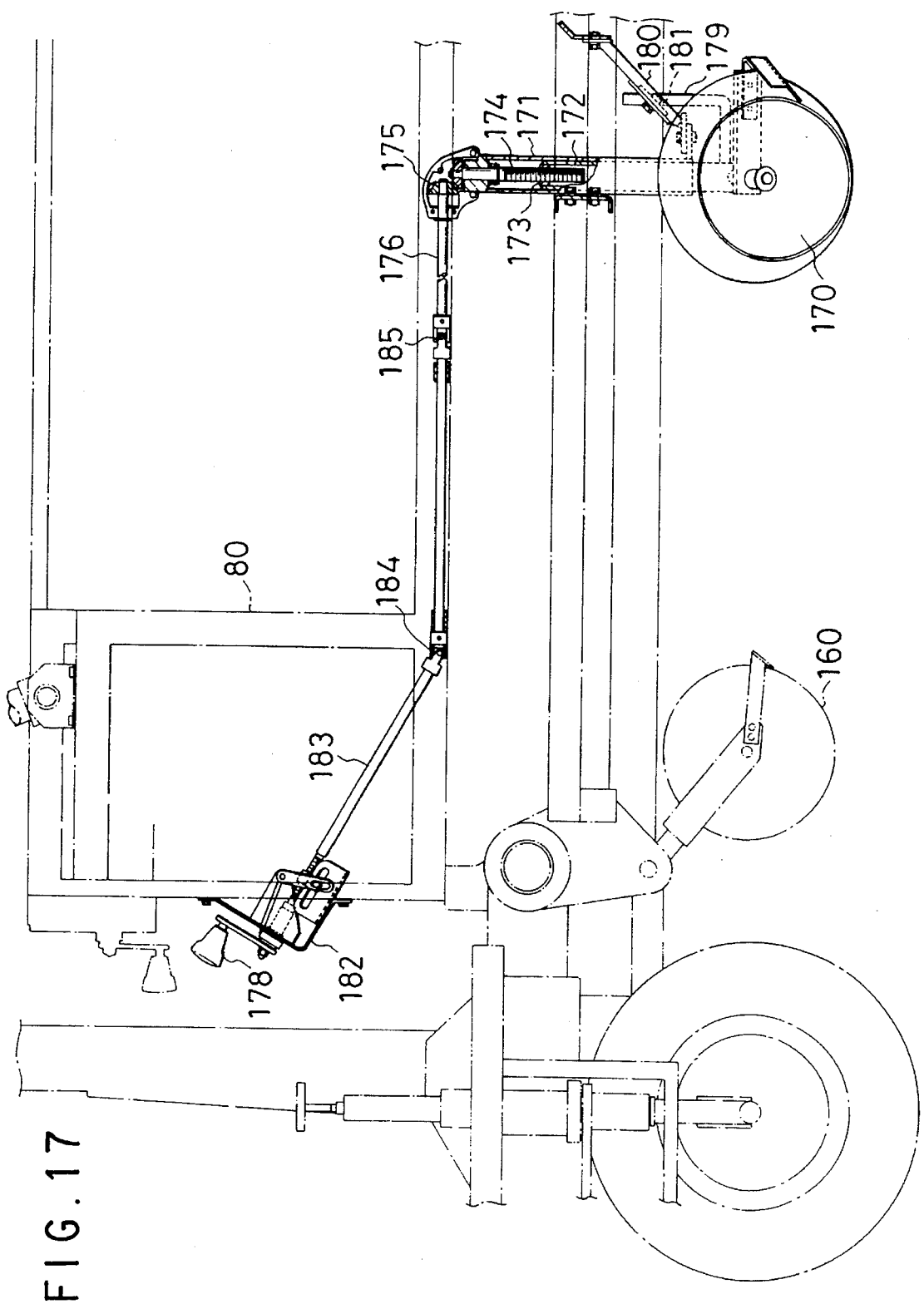
FIG. 17 is a view showing the covering wheels.

As shown in FIG. 17, the covering wheels 170 is located at the rear of the seedling planting device 150. The covering wheels 170 consists of a hollow member 171 mounted on the unit frame 80, a shaft 172 inserted into the hollow member 171, a threaded member 174 screwed into a threaded cylinder 173 provided at the upper end of the shaft 172, a rotating rod 176 connected to the upper end of the threaded member 174 through a bevel gear 175, and a handle 178 connected to the rotating rod 176 through a handle rod 183. The threaded cylinder 173 is raised and lowered by the handle 178, and thus, the pressure exerted by the covering wheels 170 can be controlled. On the other hand, a generally U-shaped member 179 is mounted on the lower end of the shaft 172 and the leading end of the member 179 extends through an aperture 181 in a plate 180 mounted on the unit frame 80 thereby preventing the rattling of the covering wheels 170 during the planting operation. In FIG. 17, the reference numeral 182 indicates a plate for supporting the handle, and the reference numerals 184 and 185 indicate universal joints respectively.

A power transmitting system in the seedling planting apparatus body 10 will be explained. FIG. 19 shows the power transmitting system from the PTO shaft 14 of the tractor 11 to the mission portion 200 of the seedling planting unit 70. The leading end of the PTO shaft 14 is connected to the bevel gear housed in the gear box 26 and the power from the PTO shaft 14 is transmitted to the driving shaft 27 through the bevel gear. The chain 25' housed in the chain case 25 is connected to the driving shaft 27 and the hexagonal shaft 28 is mounted on the output side of the chain case 25. The chain case 202 is provided adjacent to the hexagonal shaft 28 and the chain 207 is hung between the input sprocket 204 mounted on the hexagonal shaft 28 and the sprocket 206 mounted on the output shaft of the chain case 202.

At the side of the output shaft of the chain case 202, the mission case 208 mounted on the unit frame 80 is connected. The input shaft 209 of the mission case 208 is formed integrally with the output shaft 205 of the chain case 202, and thus, the power is transmitted from the chain case 202 to the mission case 208. The forward upper portion of the mission case 208 is operatively connected to the case 210 of the hexagonal shaft 201 through the chain case 202, while the forward lower portion of the mission case 208 is swingably connected to the case 210 through the link member 211 provided in parallel with the chain case 202. Therefore, the mission case 208 installed in the unit frame 80 is swingably connected to the case 210 through the parallel linkage 212 consisting of the chain case 202 and the link member 211. At the mission portion 200, a safety clutch 209' is provided between the input shaft 209 and the planting output shaft 213.

Figure 20:
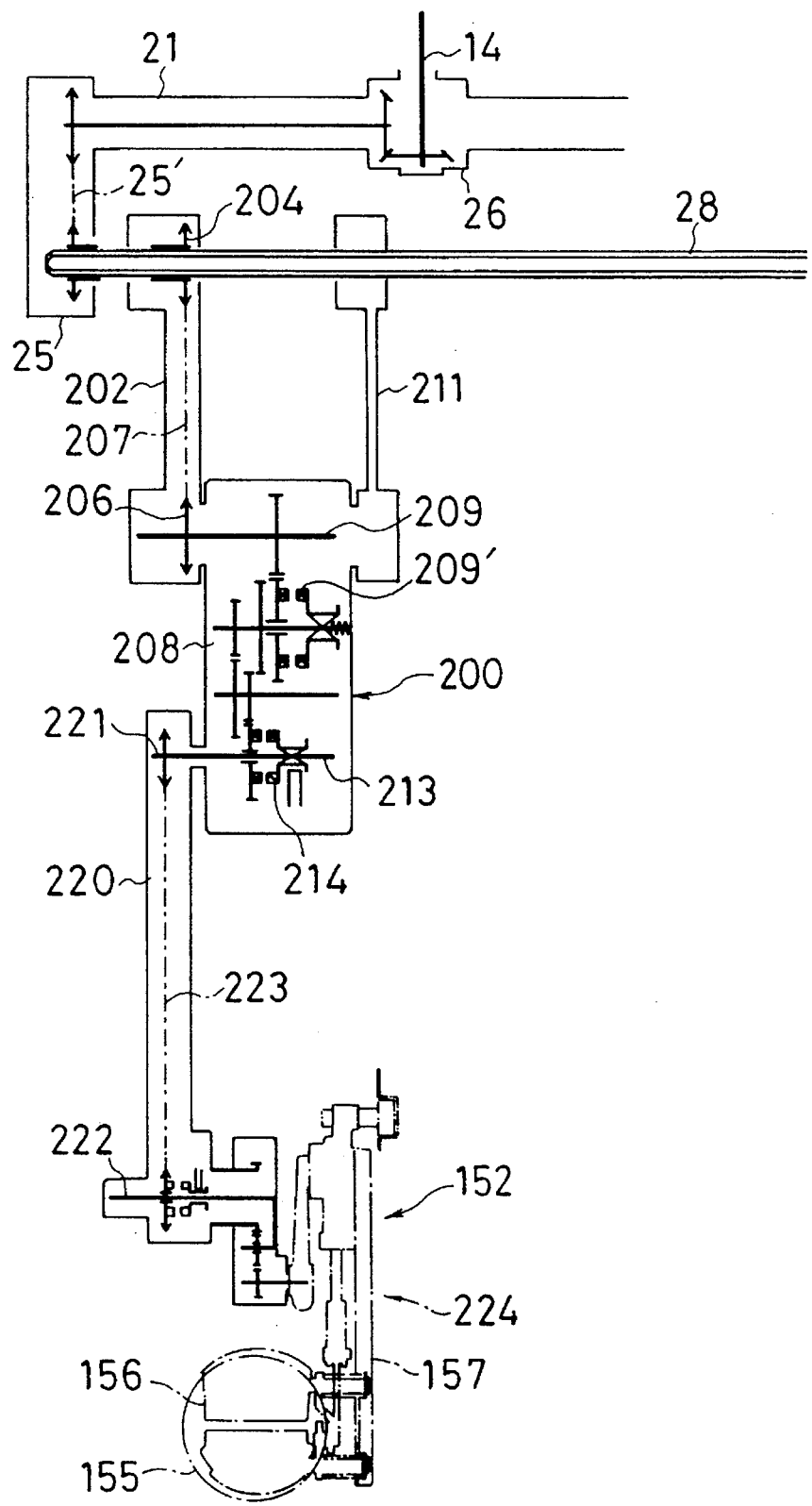
FIG. 20 is a view showing the power transmitting system of the seedling planting claws driving mechanism.

The power transmitting system from the mission portion 200 to the seedling planting claws driving mechanism 152 will be explained. As shown in FIG. 20, the power from the hexagonal shaft 28 is transmitted to the input shaft 209 through the chain 207. A safety clutch 209' is provided between the input shaft 209 and the planting output shaft 213. The seedling planting clutch 214 is provided at the planting output shaft 213 and is arranged such that the power is transmitted to the seedling planting output shaft 213 to operate the seedling planting claws 156. At the side of the seedling planting output shaft 213 of the mission portion 200, the seedling planting chain case 220 is provided. The seedling planting input shaft 221 formed integrally with the output shaft 213 and housed in the seedling planting chain case is connected to the seedling planting claws output shaft 222 through the seedling planting chain 223, and the seedling planting claws output shaft 222 is connected to the seedling planting crank mechanism 224 for the seedling planting claws 156. According to the above construction, when the power from the mission portion 200 is transmitted to the seedling planting chain 223, the seedling planting crank mechanism 224 is driven to operate the seedling planting claws 156 along a predetermined movement locus thereby picking the seedling from the tray M and planting it in the field.

Figure 18:
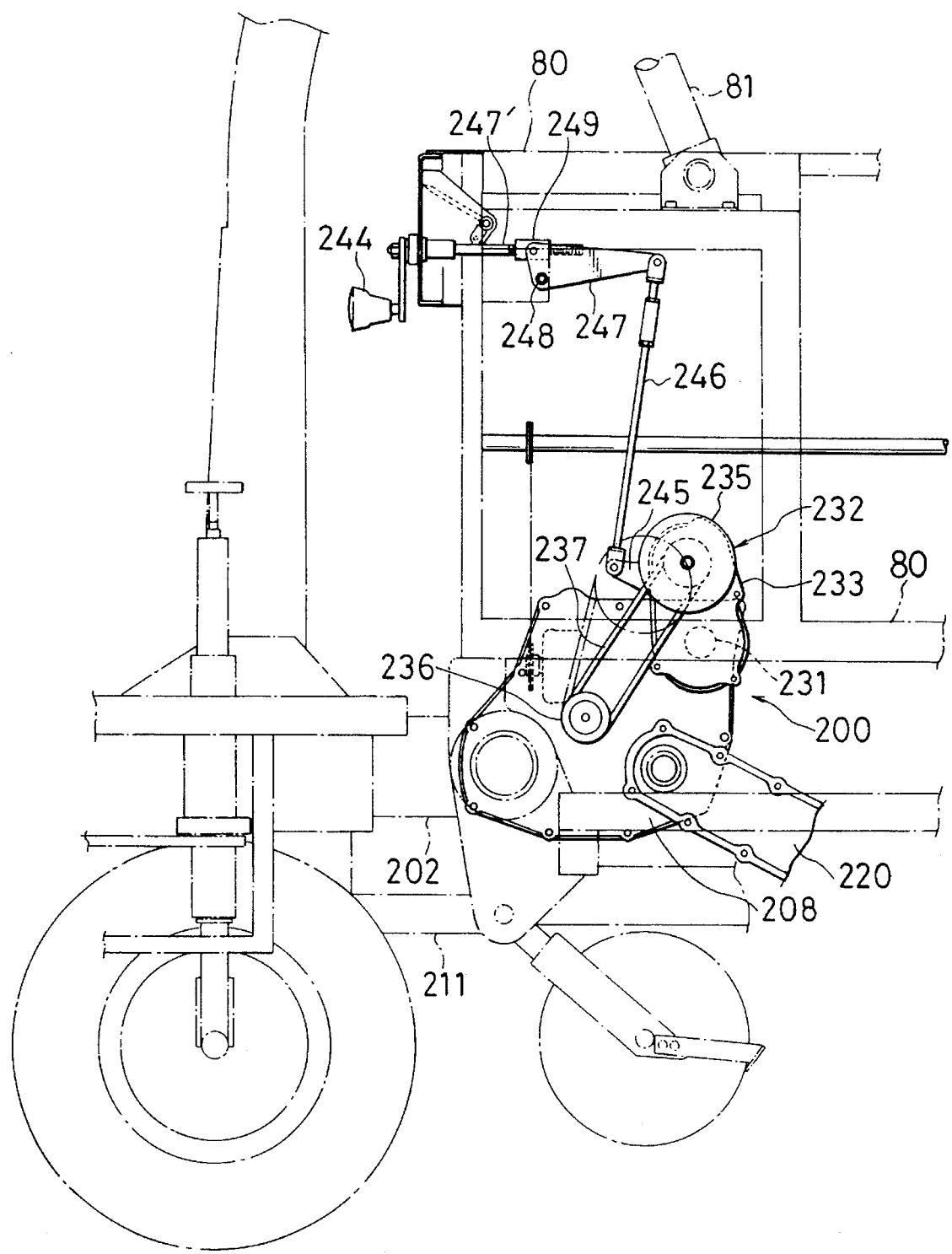
FIG. 18 is a view showing the mechanism for adjusting the seedling planting interval.

The power transmitting system from the mission portion 200 to the seedling picker driving mechanism 151 will be explained. The seedling picker output shaft 230 and the seedling picker transmission shaft 231 extend out of the mission case 208 and a transmission mechanism 232 is interposed between these shaft. As shown in FIGS. 18 and 19, the transmission mechanism 232 consists of a transmission chain case swingably connected to the seedling picker transmission shaft 231, a split pulley 235 slidably connected to the chain shaft 234 provided at the leading end of the chain case 233, a pulley 236 mounted on the seedling picker output shaft 230 of the mission case 208, and a transmission belt 237 hung between the split pulley 235 and the pulley 236. The chain case 233 is provided at its leading end with a bracket 245 to which the lower end of the operating rod 246 is connected. The leading end of the link plate 247 is connected to the upper end of the rod 246 and the link plate 247 is arranged so as to be pivoted on a pivot 248. A threaded cylinder 249 is mounted on the edge of the link plate 247 and a threaded rod 247' provided with a handle 244 for adjusting the seedling planting interval is screwed into the threaded cylinder 249. According to the above construction, when the handle 244 is turned, the link plate 247 is pivoted on the pivot 248 to be swung the speed change chain case 233 through the operating rod 246. When the speed change chain case 233 swings, the distance between the pulley 236 and the split pulley 235 varies and thus, the pulling force of the speed change belt 237 exerted on the split pulley 235 varies thereby effecting the speed change of the seedling picker speed change shaft 231 in the mission portion 231.

On the other hand, the seedling picker speed change shaft 231 is connected to the output shaft 238 through a gear train. A seedling picker operating shaft 238' having a seedling picker clutch 231' is interposed in the gear train. The operation of the seedling picker clutch 231' interacts with the seedling planting clutch 214 in the seedling planting power transmitting system. In other words, when the seedling picker clutch 231' is engaged and the seedling picker operating shaft 238' makes one rotation, the seedling planting clutch 214 is engaged to accord the timing between the seedling picker claws 154 and the seedling planting claws 156. The leading end of the output shaft 238 is operatively connected to the seedling picker main shaft 242 through the output sprocket 239, the chain 240, the input sprocket 241, etc. and the seedling picker main shaft 242 transmits the power to the seedling picker claws driving mechanism 151 through the chain 243.

The system for transmitting the power to the traverse feeding mechanism will be explained. As shown in FIG. 19, the power is transmitted from the mission portion 200 through the speed change mechanism 232 to the seedling picker main shaft 242. Then, the power is transmitted from the sprocket 250 through the mechanism 251 to the rear end of the traverse feeding shaft 111 to be rotated the traverse feeding shaft 111 thereby operating the traverse feeding mechanism 110.

The system for transmitting the power to the longitudinal feeding mechanism will be explained. As shown in FIG. 19, the power is transmitted from the mission portion 200 through the speed change mechanism 232 to the seedling picker main shaft 242, and thus, the power is transmitted from the sprocket 250 to the sprocket 252 mounted on the longitudinal feedling shaft 99.

How a seedling is planted by the apparatus 10 constructed in accordance with the above will now be explained.

If the planting of the seedling is to be carried out, the body 10 of the seedling planting apparatus is connected to the tractor 11 through the three-point linkage mechanism 12, and the planting of the seedling is carried out with causing the tractor 11 to be traveled. The power is input to the body 10 through the PTO shaft 14, and then, transmitted from the PTO shaft 14 through the mission portion 200 to the seedling picker claws mechanism 151 and the seedling planting claw driving mechanism 152. The seedling tray M is placed on the table 90, and moved by the traverse feeding mechanism and the longitudinal feeding mechanism. The seedling is picked from the seedling tray M through the seedling picker claws 154, and then, planted in the field through the seedling planting claws 156. During the planting operation, the planting unit can be adjusted vertically through the raising and lowering mechanism 81, and the pressure exerted by the wheels 160 and 170 can be varied. At the same time, the operator on the platform 40 can effect the operations of the main planting clutch lever 272, the unit clutch lever 273, etc. The empty tray M' falls from the table 90 into the tray guide rail 300 and the empty tray M' is fed toward the operator on the platform 40. Further, during the replacement of the seedling tray M, the tray placed on the preliminary table 260 is removed, and then, the tray is placed on the table 90'.

According to the present invention, since the body of the seedling planting apparatus is provided at its front portion with an operation platform, the seedling planting apparatus can travel stably, and an excessive force is not applied on the connection between the body and the traveling vehicle, and during the turning, little jolt is caused, and at the same time, an operator standing on the platform can effect all operations without getting down from the platform. Further, since the seedling picker means and the seedling planting means are located at a central portion in the longitudinal direction of the the planting unit, and a transmission device for the seedling picker means and the seedling planting means is located at one side of these means, a compact body can be achieved. Furthermore, since a pair of steerable gauge wheels are provided, the seedling planting apparatus can travel straightly even in the inclined ground.

The present invention has thus been shown and described with reference to specific embodiment. However, it should be noted that the present invention is in no way limited to the details of the described arrangements but changes and modification may be made without departing from the scope of the appended claims.

We claim:

1. A seedling planting apparatus comprising:

a body connected to the rear portion of a traveling vehicle having at least one planting unit for picking up a seedling from a pot provided in a seedling tray;

an operation platform located at a front portion of the body wherein said planting unit is arranged such that an empty seedling tray is caused to fall into a corresponding guide rail located below said planting unit, said guide rail being capable of extending back and forth along the planting unit, wherein said empty seedling tray is capable of being moved toward the front portion of the guide rail and withdrawn at the front portion of the body;

a unit frame mounted on said body, said unit frame being vertically movable:

a first table for placing the seedling tray in a vertical position wherein the first table is arranged so as to be capable of sliding back and forth along the unit frame;

a traverse feeding mechanism for moving the first table back and forth along the unit frame;

a longitudinal feeding mechanism for moving the table downward;

seedling picker means for picking the seedling from the pot; and seedling planting means for receiving the seedling from the seedling picker means.

2. A seedling planting apparatus in accordance with claim 1, wherein the seedling picker means and the seedling planting means are located at a central portion in the longitudinal direction of the planting unit and a transmission device for the seedling picker means and the seedling planting means is located at one side of the seedling picker means and the seedling planting means.

3. A seedling planting apparatus in accordance with claim 1, wherein a second table for placing a preliminary seedling tray is provided adjacent to the table for placing the seedling tray in a vertical position.

4. A seedling planting apparatus in accordance with claim 1, wherein the width of the frame defining the body of the seedling planting apparatus is adapted to be adjustable.

5. A seedling planting apparatus in accordance with claim 1, wherein below the planting unit, wheels for leveling a field is provided in front of the seedling planting means and wheels for covering the planted portion with soil is provided at rear of the seedling planting means.

6. A seedling planting apparatus in accordance with claim 1, wherein power is transmitted to the planting unit through a PTO shaft of the traveling vehicle.

7. A seedling planting apparatus in accordance with claim 1, wherein the planting unit is resiliently supported on the body of the seedling planting apparatus.

8. A seedling planting apparatus in accordance with claim 1, wherein the body of the seedling planting apparatus is provided at its front portion with a pair of steerable gauge wheels, a steering mechanism for effecting the steering of the gauge wheels and an operating member being operatively connected to the steering mechanism and located at the front of the seedling planting apparatus for controlling the steering degree of the gauge wheels.

9. A seedling planting apparatus comprising:

a body, including a main frame and a unit frame, connected to the rear portion of a traveling vehicle, said unit frame having at least one planting unit for picking up a seedling from a pot provided in a seedling tray wherein the planting unit is resiliently supported on the main frame of said body, and wherein the seedling planting apparatus is provided with at least one leveling wheel located at a front portion of the planting unit for leveling the ground for planting the seedling;

at least one pair of covering wheels located at a rear portion of the planting unit for covering the planted ground with soil; and a pair of gauge wheels located at the front portion of the body.

10. A seedling planting apparatus in accordance with claim 9, wherein the planting unit includes the unit frame mounted on the body of the seedling planting apparatus to be vertically moved, a table for placing the seedling tray in a vertical position, a traver feeding mechanism for moving the table back and forth, a longitudinal feeding mechanism for moving the table downwardly pot by pot, seedling picker means for picking the seedling from the pot, and seedling planting means for receiving the seedling from the seedling picker means to plant it in the field.

11. A seedling planting apparatus in accordance with claim 10, wherein the table is arranged so as to be slided back and forth along the unit frame.

12. A seedling planting apparatus in accordance with claim 9, wherein the seedling picker means and the seedling planting means are located at a central portion in the longitudinal direction of the the planting unit, and a transmission device for the seedling picker means and the seedling planting means is located at one side of these means.

13. A seedling planting apparatus comprising:

a body connected to the rear portion of a traveling vehicle, said body having at least one planting unit for picking up a seedling from a pot provided in a seedling tray;

a pair of steerable gauge wheels provided at a front portion of the body for effecting the steering of the gauge wheels;

an operating member being operatively connected to the steering mechanism and located at a front portion of the seedling planting apparatus for controlling the steering degree of the gauge wheels; and means for vertically adjusting the height of the gauge wheels.

14. A seedling planting apparatus in accordance with claim 13, wherein the planting unit includes an unit frame mounted on the body of the seedling planting apparatus to be vertically moved, a table for placing the seedling tray, a traver feeding mechanism for moving the table back and forth, a longitudinal feeding mechanism for moving the table downwardly pot by pot, seedling picker means for picking the seedling from the pot, and seedling planting means for receiving the seedling from the seedling picker means to plant it in the field.

15. A seedling planting apparatus in accordance with claim 14, wherein the table is arranged so as to be slided along the unit frame.

16. A seedling planting apparatus in accordance with claim 13, wherein the seedling picker means and the seedling planting means are located at a central portion in the longitudinal direction of the planting unit, and a transmission device for the seedling picker memos and the seedling planting means is located at one side of the seedling picker means and the seedling planting means.

17. A seedling planting unit for picking a seedling from a pot provided in a seedling tray, said seedling planting unit being installed in a body of a seedling planting apparatus wherein the body is connected to a rear portion of a traveling vehicle, said body comprising:

a unit frame mounted on the body that is capable of being vertically moved;

a table for placing the seedling tray in a vertical position;

a traverse feeding mechanism for moving the table back and forth;

a longitudinal feeding mechanism for downwardly moving the table;

seedling picker means for picking the seedling from the pot; and seedling planting means for receiving the seedling from the seedling picker means to plant it in the field, the seedling picker means and the seedling planting means being located at a central portion in the longitudinal direction of the planting unit; and a transmission device for the seedling picker means and the seedling planting means being located at one side of the seedling picker means and the seedling planting means, wherein the planting unit is arranged such that an empty seedling tray is caused to fall into a corresponding guide rail located below and extending along the planting unit and withdrawn from the front portion of the body.

18. A seedling planting unit in accordance with claim 17, wherein power is transmitted to the planting unit through a PTO shaft of the traveling vehicle.

19. A seedling planting unit in accordance with claim 17, wherein the planting unit is resiliently supported on the body of the seedling planting apparatus.

* * * * *

UNITED STATES PATENT AND TRADEMARK OFFICE
CERTIFICATE OF CORRECTION

PATENT NO. : 5,564,352
DATED : October 15, 1996
INVENTOR(S) : Kondo et al.

It is certified that error appears in the above-identified patent and that said Letters Patent is hereby corrected as shown below:

Column 13, line 20, immediately after "vehicle" please

Column 13, line 33, replace ":" with --;--.

Column 13, line 49, immediately after "unit" insert --,--.

Column 14, line 31, replace "traver" with --traverse--.

Column 14, line 64, replace "traver" with --traverse--.

Column 15, line 10, replace "memos" with --means--.

Signed and Sealed this

Fourteenth Day of April, 1998

Attest:

BRUCE LEHMAN

Attesting Officer

Commissioner of Patents and Trademarks